(12) United States Patent
Kamulete

(10) Patent No.: US 11,544,634 B2
(45) Date of Patent: Jan. 3, 2023

(54) SYSTEM AND METHOD FOR DETECTING DATA DRIFT

(71) Applicant: ROYAL BANK OF CANADA, Toronto (CA)

(72) Inventor: Vathy M. Kamulete, Montreal (CA)

(73) Assignee: ROYAL BANK OF CANADA, Toronto (CA)

( * ) Notice: Subject to any disclaimer, the term of this patent is extended or adjusted under 35 U.S.C. 154(b) by 368 days.

(21) Appl. No.: 16/913,256

(22) Filed: Jun. 26, 2020

(65) Prior Publication Data

US 2020/0410403 A1 Dec. 31, 2020

Related U.S. Application Data

(60) Provisional application No. 62/867,492, filed on Jun. 27, 2019, provisional application No. 63/010,245, filed on Apr. 15, 2020.

(51) Int. Cl.
*G06N 20/20* (2019.01)
*G06N 5/00* (2006.01)
*G06N 7/00* (2006.01)

(52) U.S. Cl.
CPC ............. *G06N 20/20* (2019.01); *G06N 5/003* (2013.01); *G06N 7/005* (2013.01)

(58) Field of Classification Search
CPC ........ G06N 20/20; G06N 5/003; G06N 7/005; G06N 3/08
See application file for complete search history.

(56) References Cited

U.S. PATENT DOCUMENTS

2020/0202210 A1* 6/2020 Kushnir .................. G06N 3/08
2020/0242505 A1* 7/2020 Raz ....................... G06F 16/285

OTHER PUBLICATIONS

Rosenbaum, Paul R. 2005. "An Exact Distribution-Free Test Comparing Two Multivariate Distributions Based on Adjacency." Journal of the Royal Statistical Society: Series B (Statistical Methodology) 67 (4). Wiley Online Library: 515-30, 2005.
Schelter, Sebastian, Dustin Lange, Philipp Schmidt, Meltem Celikel, Felix Biessmann, and Andreas Grafberger. 2018. "Automating Large-Scale Data Quality Verification." Proceedings of the VLDB Endowment 11 (12): 1781-94.

(Continued)

*Primary Examiner* — Brandon J Miller
(74) *Attorney, Agent, or Firm* — Norton Rose Fulbright Canada LLP

(57) ABSTRACT

Data drift or dataset shift is detected between training dataset and test dataset by training a scoring function using a pooled dataset, the pooled dataset including a union of the training dataset and the test dataset; obtaining an outlier score for each instance in the training dataset and the test dataset based at least in part on the scoring function; assigning a weight to each outlier score based at least in part on training contamination rates; determining a test statistic based at least in part on the outlier scores and the weights; determining a null distribution of no dataset shift for the test statistic; determining a threshold in the null distribution; and when the test statistic is greater than or equal to the threshold, identifying dataset shift between the training dataset and the test dataset.

20 Claims, 17 Drawing Sheets

(56) References Cited

OTHER PUBLICATIONS

Schubert, Erich, Arthur Zimek, and Hans-Peter Kriegel. 2014. "Generalized Outlier Detection with Flexible Kernel Density Estimates." In Proceedings of the 2014 Siam International Conference on Data Mining, 542-50. Siam.
Sethi, Tegjyot Singh, and Mehmed Kantardzic. 2017. "On the Reliable Detection of Concept Drift from Streaming Unlabeled Data." Expert Systems with Applications 82: 77-99.
Shah, Rajen D, and Richard J Samworth. 2013. "Variable Selection with Error Control: Another Look at Stability Selection " Journal of the Royal Statistical Society: Series B (Statistical Methodology) 75 (1): 55-80.
Snoek, Jasper, Yaniv Ovadia, Emily Fertig, Balaji Lakshminarayanan, Sebastian Nowozin, D Sculley, Joshua Dillon, Jie Ren, and Zachary Nado. 2019. "Can You Trust Your Model's Uncertainty? Evaluating Predictive Uncertainty Under Dataset Shift." In Advances in Neural Information Processing Systems, 13969-80.
Stojanov, Petar, Mingming Gong, Jaime G Carbonell, and Kun Zhang. 2019. "Low-Dimensional Density Ratio Estimation for Covariate Shift Correction." Proceedings of Machine Learning Research 89: 3449.
Sugiyama, Masashi, Motoaki Kawanabe, and Pui Ling Chui. 2010. "Dimensionality Reduction for Density Ratio Estimation in High-Dimensional Spaces. " Neural Networks 23 (1): 44-59.
Székely, Gábor J, Maria L Rizzo, et al. 2004. "Testing for Equal Distributions in High Dimension." InterStat 5 (16.10): 1249-72.
Vries, T., S. Chawla and M. E. Houle. 2012. "Density-preserving projections for large-scale local anomaly detection," Knowledge and information systems, vol. 32, pp. 25-52.
Wainberg, Michael, Babak Alipanahi, and Brendan J Frey. 2016. "Are Random Forests Truly the Best Classifiers?" The Journal of Machine Learning Research 17 (1): 3837-41.
Wang, Fulton, and Cynthia Rudin. 2017. "Extreme Dimension Reduction for Handling Covariate Shift." arXiv Preprint arXiv:1711.10938.
Wasserstein, Ronald L, Nicole A Lazar, and Others. 2016. "The Asa's Statement on P-Values: Context, Process, and Purpose." The American Statistician 70 (2): 129-33.
Wieand, Sam, Mitchell H Gail, Barry R James, and Kang L James. 1989. "A Family of Nonparametric Statistics for Comparing Diagnostic Markers with Paired or Unpaired Data " Biometrika 76 (3): 585-92.
Zimek, Arthur, Matthew Gaudet, Ricardo JGB Campello, and Jörg Sander. 2013. "Subsampling for Efficient and Effective Unsupervised Outlier Detection Ensembles." In Proceedings of the 19th Acm Sigkdd International Conference on Knowledge Discovery and Data Mining, 428-36. ACM.
Zimek, Arthur, Erich Schubert, and Hans-Peter Kriegel. 2012. "A Survey on Unsupervised Outlier Detection in High-Dimensional Numerical Data." Statistical Analysis and Data Mining: The ASA Data Science Journal 5 (5): 363-87.
Zhang, Jin. 2002. "Powerful Goodness-of-Fit Tests Based on the Likelihood Ratio." Journal of the Royal Statistical Society: Series B (Statistical Methodology) 64 (2): 281-94.
Zhang, Jin. 2006. "Powerful Two-Sample Tests Based on the Likelihood Ratio." Technometrics 48 (1): 95-103.
Arlot, Sylvain, Alain Celisse, and Others. 2010. "A Survey of Cross-Validation Procedures for Model Selection. " Statistics Surveys 4: 40-79.
Arlot, Sylvain, and Matthieu Lerasle. 2016. "Choice of V for V-Fold Cross-Validation in Least-Squares Density Estimation." The Journal of Machine Learning Research 17 (1): 7256-7305.
Bickel, Steffen, Michael Brückner, and Tobias Scheffer. 2007. "Discriminative Learning for Differing Training and Test Distributions." In Proceedings of the 24th International Conference on Machine Learning, 81-88. ACM.
Breck, Eric, Neoklis Polyzotis, Sudip Roy, Steven Whang, and Martin Zinkevich. 2019. "Data Validation for Machine Learning." SysML.
Breiman, Leo. 2001. "Random Forests." Machine Learning 45 (1): 5-32.
Breunig, Markus M, Hans-Peter Kriegel, Raymond T Ng, and Jörg Sander. 2000. "LOF: Identifying Density-Based Local Outliers." In Proceedings of the 2000 Acm Sigmod International Conference on Management of Data, 93-104.
Brys, G., M. Hubert and A. Struyf. 2004. "A robustification of the Jarque-Bera test of normality," in COMPSTAT Symposium, Section: Robustness.
Casalicchio, Giuseppe, Jakob Bossek, Michel Lang, Dominik Kirchhoff, Pascal Kerschke, Benjamin Hofner, Heidi Seibold, Joaquin Vanschoren, and Bernd Bischl. 2017. "OpenML: An R Package to Connect to the Machine Learning Platform Openml." Computational Statistics 32 (3): 1-15. https://doi.org/10.1007/s00180-017-0742-2.
Chen, Xiangli, Mathew Monfort, Anqi Liu, and Brian D Ziebart. 2016. "Robust Covariate Shift Regression." In Artificial Intelligence and Statistics, 1270-9.
Ciémençon, S., M. Depecker and N. Vayatis. 2009. "AUC optimization and the two-sample problem," Proceedings of the 22nd International Conference on Neural Information Processing Systems.
Cieslak, David A, and Nitesh V Chawla. 2009. "A Framework for Monitoring Classifiers' Performance: When and Why Failure occurs?" Knowledge and Information Systems 18 (1): 83-108.
Cook, R Dennis, and Sanford Weisberg. 1980. "Characterizations of an Empirical Influence Function for Detecting Influential Cases in Regression." Technometrics 22 (4): 495-508.
D'agostino, R. B., A. Belanger and R. B. D'Agostino Jr. 1990. "A suggestion for using powerful and informative tests of normality," The American Statistician, vol. 44, pp. 316-321.
Davison, C. and R. L. Smith. 1990. "Models for exceedances over high thresholds," Journal of the Royal Statistical Society: Series B (Methodological), vol. 52, pp. 393-425.
Davison, C. and C.-L. Tsai. 1992. "Regression model diagnostics," International Statistical Review/Revue Internationale de Statistique, pp. 337-353.
Demidenko, E. 2016. "The p-value you can't buy". In: The American Statistician 70.1, pp. 33-38.
Devries, T. and G. W. Taylor. 2018. "Learning confidence for out-of-distribution detection in neural networks," arXiv preprint arXiv:1802.04865.
Emmott, Andrew F, Shubhomoy Das, Thomas Dietterich, Alan Fern, and Weng-Keen Wong. 2013. "Systematic Construction of Anomaly Detection Benchmarks from Real Data." In Proceedings of the Acm Sigkdd Workshop on Outlier Detection and Description, 16-21. ACM.
Emmott, Andrew, Shubhomoy Das, Thomas Dietterich, Alan Fern, and Weng-Keen Wong. 2015. A Meta-Analysis of the Anomaly Detection Problem. arXiv Preprint arXiv:1503.01158.
Fernández-Delgado, Manuel, Eva Cernadas, Senén Barro, and Dinani Amorim. 2014. "Do We Need Hundreds of Classifiers to Solve Real World Classification Problems?" The Journal of Machine Learning Research 15 (1): 3133-81.
Friedman, J. 2004. "On multivariate goodness-of-fit and two-sample testing."
Fisher, R. A. 1936. "The use of multiple measurements in taxonomic problems," Annals of eugenics, vol. 7, pp. 179-188.
Gandy, A. 2009. "Sequential implementation of Monte Carlo tests with uniformly bounded resampling risk," Journal of the American Statistical Association, vol. 104, pp. 1504-1511.
Gretton, Arthur, Kenji Fukumizu, Zaid Harchaoui, and Bharath K Sriperumbudur. 2009. "A Fast, Consistent Kernel Two-Sample Test." In Advances in Neural Information Processing Systems, 673-81.
Gretton, Arthur, Karsten M Borgwardt, Malte J Rasch, Bernhard Schölkopf, and Alexander Smola. 2012. "A Kernel Two-Sample Test." Journal of Machine Learning Research 13 (Mar.): 723-73.
Hariri, S., M. C. Kind and R. J. Brunner. 2018. "Extended isolation forest," arXiv preprint arXiv:1811.02141.

(56) References Cited

OTHER PUBLICATIONS

Hido, Shohei, Yuta Tsuboi, Hisashi Kashima, Masashi Sugiyama, and Takafumi Kanamori. 2011. Statistical Outlier Detection Using Direct Density Ratio Estimation. Knowledge and Information Systems 26 (2): 309-36.

Hendrycks, D. and K. Gimpel. Apr. 24-26, 2017. "A Baseline for Detecting Misclassified and Out-of-Distribution Examples in Neural Networks," 5th International Conference on Learning Representations, ICLR 2017, Toulon, France, Conference Track Proceedings.

Hollander, Myles, Douglas A Wolfe, and Eric Chicken. 2013. Nonparametric Statistical Methods. vol. 751. John Wiley & Sons.

Kanamori, Takafumi, Taiji Suzuki, and Masashi Sugiyama. 2011. "ff-Divergence Estimation and Two-Sample Homogeneity Test Under Semiparametric Density-Ratio Models." IEEE Transactions on Information Theory 58 (2): 708-20.

Kingma, D. P. and P. Dhariwal. 2018. "Glow: Generative flow with invertible 1×1 convolutions," Advances in Neural Information Processing Systems.

Koh, Pang Wei, and Percy Liang. 2017. "Understanding Black-Box Predictions via Influence Functions." In Proceedings of the 34th International Conference on Machine Learning—vol. 70, 1885-94. JMLR. org.

Kohavi, Ron, and Others. 1995. "A Study of Cross-Validation and Bootstrap for Accuracy Estimation and Model Selection." In Ijcai, 14:1137-45. 2. Montreal, Canada.

Liu, F. T., K. M. Ting and Z.-H. Zhou. 2010. "On detecting clustered anomalies using SCiForest," in Joint European Conference on Machine Learning and Knowledge Discovery in Databases.

Liu, F. T., K. M. Ting and Z.-H. Zhou. 2012. "Isolation-based anomaly detection," ACM Transactions on Knowledge Discovery from Data (TKDD), vol. 6, pp. 1-39.

Liu, Fei Tony, Kai Ming Ting, and Zhi-Hua Zhou. 2008. "Isolation Forest." Eighth Ieee International Conference an Data Mining, 413-22. IEEE.

Li, Jialiang, and Jason P Fine. 2010. "Weighted Area Under the Receiver Operating Characteristic Curve and Its Application to Gene Selection." Journal of the Royal Statistical Society: Series C (Applied Statistics) 59 (4): 673-92.

Lopez-Paz, D. and M. Oquab. Apr. 24-26, 2017. "Revisiting Classifier Two-Sample Tests". In: 5th International Conference on Learning Representations, ICLR 2017, Toulon, France, Conference Track Proceedings. OpenReview.net. URL: https://openreview.net/forum?id=SJkXfE5xx.

Marozzi, Marco. 2004. "Some Remarks About the Number of Permutations One Should Consider to Perform a Permutation Test." Statistica 64 (1): 193-201.

Moreno-Torres, Jose García, José a Sáez, and Francisco Herrera. 2012. "Study on the Impact of Partition-Induced Dataset Shift on kk-Fold Cross-Validation " IEEE Transactions on Neural Networks and Learning Systems 23 (8): 1304-12.

Moreno-Torres, Jose G, Troy Raeder, Rocío Alaiz-Rodríguez, Nitesh V Chawla, and Francisco Herrera. 2012. "A Unifying View on Dataset Shift in Classification. " Pattern Recognition 45 (1): 521-30.

Papamakarios, George, Theo Pavlakou, and Iain Murray. 2017. "Masked Autoregressive Flow for Density Estimation." In Advances in Neural Information Processing Systems, 2338-47.

Pevny, Tomáš. 2016. "Loda: Lightweight on-Line Detector of Anomalies." Machine Learning 102 (2). Springer: 275-304.

Pedregosa, F., G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot and E. Duchesnay. 2011. "Scikit-learn: Machine Learning in Python," Journal of Machine Learning Research, vol. 12, pp. 2825-2830.

Probst, Philipp, Anne-Laure Boulesteix, and Bernd Bischl. 2019. "Tunability: Importance of Hyperparameters of Machine Learning Algorithms." Journal of Machine Learning Research 20 (53): 1-32.

Quionero-Candela, Joaquin, Masashi Sugiyama, Anton Schwaighofer, and Neil D Lawrence. 2009 "Dataset Shift in Machine Learning " The MIT Press.

Rabanser, Stephan, Stephan Günnemann, and Zachary Lipton. 2019. "Failing Loudly: An Empirical Study of Methods for Detecting Dataset Shift." In Advances in Neural Information Processing Systems, 1394-1406.

Raeder, Troy, and Nitesh V Chawla. 2009. "Model Monitor (M2): Evaluating, Comparing, and Monitoring Models." Journal of Machine Learning Research 10 (Jul.): 1387-90.

Ramdas, A., S. J. Reddi, B. Poczos, et al. 2015. "On the decreasing power of kernel and distance based nonparametric hypothesis tests in high dimensions" In: Twenty-Ninth AAAI Conference on Artificial Intelligence.

* cited by examiner

| Tests | P-values | Pass/Fail |
|---|---|---|
| K-S (x-axis) | 0.440 | ✗ |
| K-S (y-axis) | 0.120 | ✗ |
| Energy | 0.002 | ✓ |
| Domain Classifier | 0.000 | ✓ |
| D-SOS (WAUC) | 0.000 | ✓ |

FIG. 6B

| Test | P-value | Pass/Fail |
|---|---|---|
| K-S (x-axis) | 0.000 | ✗ |
| K-S (y-axis) | 0.000 | ✗ |
| Energy | 0.002 | ✗ |
| Classifier Test (RF) | 0.000 | ✗ |
| D-SOS (Outlier) | 1.000 | ✓ |
| D-SOS (Classifier) | 0.000 | ✗ |

FIG. 7B

SYSTEM AND METHOD FOR DETECTING DATA DRIFT

CROSS-REFERENCE TO RELATED APPLICATION(S)

This application claims priority from U.S. Provisional Patent Application No. 63/010,245, filed on Apr. 15, 2020, and U.S. Provisional Patent Application No. 62/867,492, filed on Jun. 27, 2019, the contents of which are incorporated by reference herein.

FIELD

This relates to the integrity of data sets, and in particular, data drift or dataset shift.

BACKGROUND

Data drift or dataset shift may be defined as unexpected changes to data structure and/or semantics. In the field of machine learning, data drift may occur when training data is very different from test data. Existing techniques to test for data drift as between training data and test data were conceived on a smaller data set than current machine learning and big data environments.

SUMMARY

According to an aspect, there is provided a computer-implemented method for detecting dataset shift between a training dataset and a test dataset, the method comprising: training a scoring function using a pooled dataset, the pooled dataset including a union of the training dataset and the test dataset; obtaining an outlier score for each instance in the training dataset and the test dataset based at least in part on the scoring function; assigning a weight to each outlier score based at least in part on training contamination rates; determining a test statistic based at least in part on the outlier scores and the weights; determining a null distribution of no dataset shift for the test statistic; determining a threshold in the null distribution; determining whether the test statistic is greater than or equal to the threshold; and when the test statistic is greater than or equal to the threshold, identifying dataset shift between the training dataset and the test dataset.

In some embodiments, the test statistic is a weighted area under a receiver characteristic curve (WAUC).

In some embodiments, the test statistic is based on:

$$T = \int_{\lfloor s \rfloor}^{\lceil s \rceil} D(s) \cdot w(s) \cdot d(s)$$

where T is the WAUC, $\lfloor s \rfloor$ and $\lceil s \rceil$ are the lower and upper bound outlier scores, $D(s)$ is defined as $C^{te}(s) \cdot f_s^{tr}(s)$, $C^{te}(s)$ is a testing contamination rate, $f_s^{tr}(s)$ is a probability density function for the training dataset, $w(s)$ is a weight function, and integration is with respect to s.

In some embodiments, the method further comprises: labelling training instances in the pooled dataset and labelling test instances in the pooled dataset to form labels; and wherein the test statistic is determined based at least in part on the labels.

In some embodiments, the null distribution is determined based at least in part on the outlier scores, the labels, and the weights.

In some embodiments, the null distribution is determined based at least in part on shuffled data from randomly permutated instances in the pooled dataset.

In some embodiments, the random permutations are sampled using a sequential Monte Carlo test.

In some embodiments, the scoring function is based on anomaly detection.

In some embodiments, the anomaly detection is by way of density estimation based on:

$$\phi(x_i) \leq \phi(x_j) \Rightarrow Pr(f_X^{tr}(x_i) \geq f_X^{tr}(x_j)) \geq 1 - \in$$

where $\phi$ is the scoring function, $x_i, x_j \in \chi$, $\chi$ is a domain of the training dataset and the test dataset, $f_X^{tr}$ is a training dataset probability density function, and $\in$ is an approximation error.

In some embodiments, the scoring function includes an Isolation Forest.

In some embodiments, the Isolation Forest is a function of the pooled dataset and hyperparameters.

In some embodiments, the scoring function is based on probabilistic classification.

In some embodiments, the scoring function includes a Random Forest.

In some embodiments, the Random Forest is a function of the pooled dataset and hyperparameters.

In some embodiments, the hyperparameters are calibrated with a Brier score.

In some embodiments, the weight of outlier score, $w(s)$, is based on:

$$w(s) = 1 - C^{tr}(s) \cdot (2 - C^{tr}(s))$$

where $C^{tr}(s)$ is the training contamination rate for the outlier score s.

In some embodiments, for a specified type-1 error $\alpha$, the threshold is a $1-\alpha$ percentile in a right tail of the null distribution.

In some embodiments, the scoring function includes a density estimation based on a deep neural network.

According to another aspect, there is provided a computer system comprising: a processor; a memory in communication with the processor, the memory storing instructions that, when executed by the processor cause the processor to perform a method as described herein.

According to a further aspect, there is provided a non-transitory computer readable medium comprising a computer readable memory storing computer executable instructions thereon that when executed by a computer cause the computer to perform a method as described herein.

Other features will become apparent from the drawings in conjunction with the following description.

BRIEF DESCRIPTION OF DRAWINGS

In the figures which illustrate example embodiments,

FIG. 6B is a table of tests performed on the first data of FIG. 6A, according to an embodiment.

FIG. 7B is a table of tests performed on the second data of FIG. 7A, according to an embodiment.

DETAILED DESCRIPTION

Figure 1:
FIG. 1 is an illustration of prediction drift, testing equality of distributions using a Kruskal-Wallis Test, according to an embodiment.

Data drift or dataset shift refers to the notion that while the underlying processes per se might not have changed, training data can be very different from test data encountered live at deployment time and may come from different distributions. This may be a sample mismatch problem; that is, a region of the data space is either too sparse or ignored during training and becomes disproportionally important at test time or during deployment.

Traditionally, dataset shift can be detected with (statistical) tests of equal distributions. However, conventional statistical tests for detecting changes in data distribution may be too sensitive and uninformative for the typical scale of data in machine learning pipelines. Existing methods may suffer from a "false alarms" problem—current methods rightly detect changes in distributions, however, most differences in distributions should be ignored.

Traditional off-the-shelf multivariate tests of equal distributions can be too strict. With a large sample size, they often reject the null of no difference even when the difference is small and inconsequential (Wasserstein, Lazar, and others (2016)).

However, not all changes in distribution are a cause for concern. In particular, systems and methods for dataset shift detection, as disclosed herein, focus more on outliers than inliers because there should be few, if any, outliers and there are typically sufficient examples of inliers.

A priori, predictive models are not expected to perform well on rare inputs, unless the model is robust to covariate shift (e.g., Chen et al (2016)) and even then, predicting for an instance which has few similar training examples can be precarious.

Tests of equal distributions require high fidelity between training and test set everywhere over the input domain. Instead the proposed D-systems and methods for dataset shift focus on low-density regions, requiring high fidelity in regions with the least confidence. The outlying regions subsume out-of-distribution examples, inputs far out in the data distribution tails that the model will likely mispredict (see Wasserstein et al (2016) and DeVries et al (2018)).

To test for dataset shift, a measure of (distributional) divergence between training and test set may be performed. There are two key challenges in doing so, in particular with big and high-dimensional datasets: mapping the data into a low-dimensional representation and choosing the appropriate statistic to detect whether the observed differences are indeed indicative of a meaningful shift in the data distribution.

A challenge in testing for dataset shift is to map the data, which is often multivariate (high-dimensional) and contains a mix of both categorical and continuous features, into a lower—for convenience, univariate—score representative of the original dataset. A common approach to achieve this is by using model predictions (Cieslak and Chawla (2009)). That is, having trained the model, any instance is replaced with its prediction. The main disadvantage of this framework is that it assumes that the model itself is reliable and encodes the dataset through its predictions in a meaningful way. The latter point emphasizes that even if the model is specified correctly, i.e., the true model is known, it does not necessarily follow that predictions preserve the characteristics needed to tell if the data diverges.

Another challenge is to choose the appropriate statistic with known critical values to detect dataset shift. This may be a two-sample test in the context of null hypothesis testing. Recent methods for two-sample test include kernel tests (popular in machine learning communities), energy tests and cross match tests (see Gretton et al (2009), Székely, Rizzo, and others (2004), and Rosenbaum (2005)). The robust nonparametric Kruskall-Wallis (KW) test is used in Cieslak and Chawla (2009) to compare distributions. Other methods like the Kolmogorov-Smirnov (KS) test, the Kullback-Leibler (KL) divergence and the maximum mean discrepancy can also be used.

FIG. 1 shows the results of a KW test on prediction drift for two models. One model, labelled (2), overfits; the other, labelled (1), does not. Each column is a model. Each row indicates whether the predictions are from the training or test set. Thus, each panel in the quadrant illustrated in FIG. 1 corresponds to a model-data pair. Moving down the column for model (2), the distributions for predictions look different. The KW test also rejects the null hypothesis that the predictions of the training and test set come from different distributions (the p-value is less than 0.001). The test alone erroneously suggests that there is strong evidence of data drift. This, however, conflates overfitting with data drift. For comparison, moving down the column for model (1), the distributions look similar. Indeed, the KW test fails to reject the null hypothesis that the predictions are from different distributions (the p-value is 0.202). This highlights the importance of decoupling data drift from model specification: if the model is somehow misspecified, the tests are adversely affected.

Sample size affects both computational tractability and statistical inference. Not only does a large sample size lead to spurious rejections of the null, it makes multivariate tests of equal distributions (e.g., Gretton et al (2012)) impractical because of prohibitive memory requirements.

As disclosed herein, systems and methods for dataset shift detection, referred to herein as dataset shift with outlier scores ("D-SOS"), can provide a scalable and lenient two-sample test of dataset shift based on outlier scores, such as anomaly detection or probabilistic classification. While D-SOS is described herein with reference to dataset shift between a training dataset and a test dataset, it should be appreciated that techniques disclosed herein may be applied to any other suitable datasets to detect dataset shift between such datasets.

D-SOS accommodates different notions of outlyingness, and can be based on (1) outlier scores from anomaly detection (referred to as "D-SOS (Outlier)" herein), or (2) membership probabilities from probabilistic classification (referred to as "D-SOS (Classifier)" herein).

Existing dataset shift tests are often susceptible to false alarms: they are too sensitive to minor differences in regions that already have adequate sample coverage. In contrast, D-SOS discounts most inliers (regions of low interest) and focuses on low-density regions.

Aspects of D-SOS can reduce observations (for example, high-dimensional data observations) to outlier scores and compare contamination rates at varying threshold splits.

D-SOS scales gracefully with sample size and dimension if mapping to the relevant outlier subspace, its low-rank representation, which can be computationally cheap and conceptually convenient for discriminating amongst samples. It inherits the time and space complexity of the method used to assign outlier score to data points.

Practitioners tend to distrust tests of equal distributions due to their high false alarm rate. Breck et al (2019) argues that "statistical test for detecting changes in the data distribution [ . . . ] are too sensitive and also uninformative for the typical scale of data in ML pipelines". It is instead desirable for effect size to be large and consequential before raising the alarm.

To confront the "false alarm" problem, D-SOS uses a robust test statistic, the weighted area under the receiver operating characteristic curve (WAUC), to detect genuinely damaging dataset shifts, namely, the shifts most likely to affect the predictive performance adversely. WAUC, the weighted area under the receiver operating characteristic curve, is a robust statistic based on ranks. The WAUC can be interpreted as the probability of observing higher outlier scores in the test set than were in training. Colloquially, D-SOS tests whether the new sample is worse than the old sample, not if the two are the same.

The weights in the WAUC discount regions where differences are immaterial. Low-scoring regions (inliers) have low weights and conversely, high-scoring ones (outliers), high weights. Thus, D-SOS chases the tails.

The weights in the WAUC can be considered to determine the "importance" of an instance based on its (pseudo) density. High-density instances (inliers) have low weights and conversely, low-density instances (outliers), relatively higher weights.

An existing challenge with large sample size (big n), are the memory requirements and that with a large enough sample, n, the null will always be rejected. Embodiments of D-SOS can address challenges with large sample sizes by WAUC, which provides a robust statistic based on ranks.

Another challenge exists with large features sets (big p), as the power of kernel-based or distance-based multivariate tests of equal distributions drops polynomially with increasing dimension, p, against fair alternatives. Embodiments of D-SOS can address challenges with large features sets by use of Isolation Forest and dimensionality reduction through outlier detection.

Embodiments of D-SOS have been evaluated on both real and simulated datasets and benchmarked against the domain classifier approach to detecting dataset shift. Conveniently, where existing tests can be uninformative or impractical, D-SOS may be fast and memory-efficient, and may raise fewer false alarms for benign shifts in distribution, while detecting harmful inputs and report the most anomalous inputs.

Figure 2:
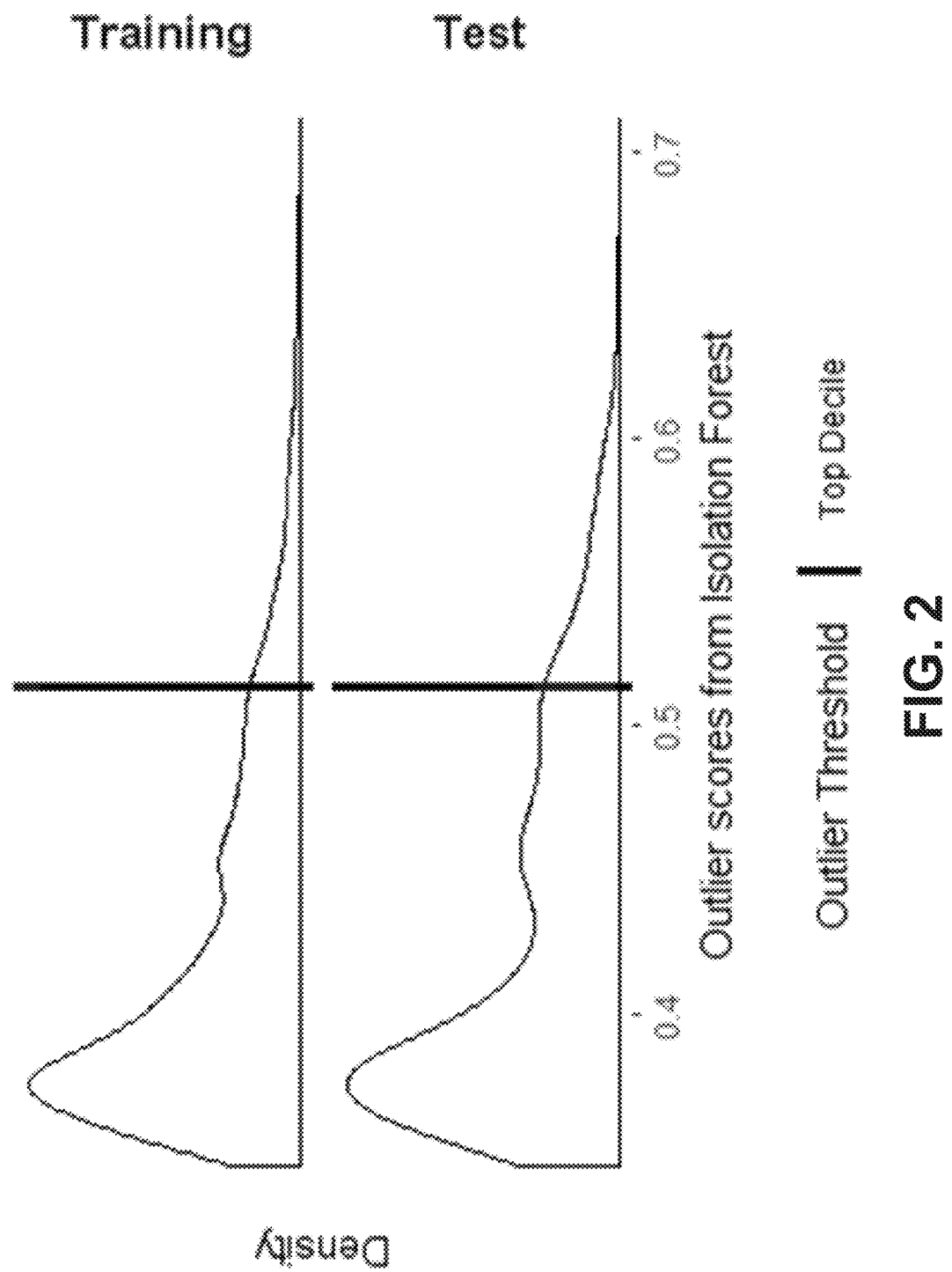
FIG. 2 is an illustration of detecting dataset shift from outlier scores, according to an embodiment.

FIG. 2 shows that the results of D-SOS testing for distributional divergence using outlier scores from Isolation Forest. Visually, the two distributions look similar. Moreover, the relevant distributional changes are in the right tail of the distributions, where the outliers are. The left tail and the mode of the distribution delineate normal points and so those regions can be safely ignored, that is, only threshold exceedances are of interest. Following extreme value theory, threshold exceedances can be modelled as the generalized Pareto distribution and so parametric tests are also available (Davison and Smith (1990)). Parametric tests can be constructed to determine whether the right tail of the distributions are indeed different. However, to be consistent with the test on predictions drift, the KW test may be re-used on threshold exceedances, making no distributional assumptions. The KW test on threshold exceedances fails to reject the null hypothesis that the data are from the same distribution (the p-value is 0.859), confirming visual inspection from the plot. D-SOS detects no evidence of data drift, in accordance with model (1) in FIG. 1.

Conveniently, D-SOS systems and methods for detecting dataset shift, as disclosed herein, may provide the following advantages:

Scale in high dimension (big p) with big data (big n);
Are robust to false alarms;
Account for (multivariate) correlation;
Focus on unusual inputs (outliers);
Map to an interpretable low-dimension representation;
Are insensitive to (predictive) model misspecification; and
Handle continuous, categorical and missing data out-of-the-box.

Many existing outlier detection methods, e.g., Schubert, Zimek, and Kriegel (2014) and Breunig et al (2000), are based on some form of density estimation. This connection suggests that the outlier subspace is an informative, albeit rough and lossy, low-rank representation of the density.

Density ratios are used for example in outlier detection (Hido et al (2011)), in two-sample homogeneity tests (Kanamori, Suzuki, and Sugiyama (2011)), and in covariate shift adaption (Stojanov et al (2019)) to name but a few select applications. Estimating density ratios is often substantially easier than estimating separate densities. Estimating outlier scores, as a proxy, can be easier still. D-SOS replaces densities or density ratios with outlier scores to retain the salient characteristics of the data distribution.

To cope with the curse of dimensionality, dimensionality reduction is crucial, even for density ratios (see Sugiyama, Kawanabe, and Chui (2010); Wang and Rudin (2017); Stojanov et al (2019); etc). In a supervised setting, some methods, e.g., Cieslak and Chawla (2009), assume that model predictions mirror data shift; they use the predictions as the low-rank representation for the data. This assumes that data shift manifests itself as changes in the prediction distribution and entangles the predictive model, subject to its own sources of errors such as misspecification and overfitting, with dataset shift.

D-SOS techniques disclosed herein instead disentangle the data distribution from the predictive model. D-SOS reduces to outlier scores as its low-rank representation and forgoes tests of equal distributions because they are often too strict. Furthermore, the D-SOS scoring function for outlier detection is effectively a device for dimension reduction.

The area under the receiver operating characteristic curve (AUC) has a tradition as a robust statistic in nonparametric tests. In the context of classifier two-sample tests, Ciémen- çon et al (2009) pairs a high-capacity classifier with the AUC—via the Mann-Whitney-Wilcoxon test.

Demidenko (2016) proposes the D-value, a variant of the AUC, as an alternative to the classical tests at scale because the latter "do not make sense with big data: everything becomes statistically significant" while the AUC attenuates the strong bias toward large sample size.

As a generalization of the AUC, the weighted AUC (WAUC) overcomes one major drawback: the AUC puts uniform weights on thresholds (Li and Fine (2010)). Instead, the WAUC specifies the threshold contribution.

D-SOS techniques disclosed herein give more weight to outlying (low-density) regions of the data distribution. D-SOS monitors instances in the "outlying" and "low-density" regions of the data.

Apart from statistical tests, example-based diagnostics e.g., Koh and Liang (2017) can help identify when models fail. Outliers are often high-leverage or influential examples and may unduly distort the predictive model (Cook and Weisberg (1980)). High-leverage points are observations whose lack of neighboring observations means that they exert a strong pull on the model; influential points are observation whose deletion from the dataset would noticeably change the specification (form) of the final model. Because outliers are often high-leverage and/or influential points, they may unduly skew the results of model fitting. As model performance critically depends on data quality, data validation (Schelter et al (2018); Breck et al (2019)) emphasizes the role of unexpected inputs (outliers) in the modeling pipeline.

Anticipating the need for interpretable diagnostics at the instance level, D-SOS techniques disclosed herein report the most anomalous instances, regardless of the result (p-value) of the test. A statistical test is a binary yes-no summary statistic of the entire dataset. It often is too broad. Drilling down to the instance level gives a more nuanced view, the ability to trace global effect to local causes.

D-SOS is a two-sample multivariate test that can be powerful against tail divergences, rather than against all possible alternatives.

Aspects of D-SOS are configured to "reduce-split-compare": reduce high-dimensional data to an outlier score; pick thresholds to split samples; weigh instances in low-density regions (outliers) higher than instances in high-density regions (inliers); and compare contamination rates (proportions) across samples.

The theoretical framework of D-SOS builds on the framework in Zhang (2002) and Zhang (2006). For brevity, this framework is referred to herein as the "Zhang test". The exposition in the Zhang test is for the univariate case; D-SOS, by contrast, is an extension to the multivariate case.

In an example notation, there is provided an independent and identically distributed (i.i.d.) training set $X^{tr}=\{x_i^{tr}\}_{i=1}^{n^{tr}}$ and a test set $X^{te}\{x_i^{te}\}_{i=1}^{n^{te}}$. Without loss of generality, no distinction is made between the supervised and unsupervised case. Each dataset $X^o$ with origin $o \in \{tr(aining), te(st)\}$ lies in d-dimensional domain $\chi \subset \mathbb{R}^d$ with sample sizes $n^o$, cumulative distribution function (CDF) $F_X^o$ and probability density function (PDF) $f_X^o$.

Let $\phi: \chi \rightarrow S \subset \mathbb{R}$ be a scoring function to be defined. With a fixed score $s \in S$, define binary instances $b_i^o(s) = \mathbb{1}(\phi(x_i^o) > s)$ such that $b_i^o(s)$ is 1 when the score $\phi(x_i^o)$ exceeds s and 0, otherwise. The proportion above the score s in dataset o is in effect the contamination rate $C^o(s)=Pr(b_i^o(s)=1)$, the proportion of outliers. As before, $F_S^o$ and $f_S^o$ are the score CDF and PDF.

Consider the null hypothesis $H:F_X^{te}=F_X^{tr}$ that the two distributions are the same against the alternative $\overline{H}:F_X^{te} \neq F_X^{tr}$ that they are not. The Zhang test proceeds in 3 steps. It (1) scores each instance with the scoring function $\phi$, (2) picks progressively higher threshold scores to split each sample and (3) compares the contamination rates across samples. (2) and (3) cleverly break up the problem of testing for equal distribution into a series of tests of equal contaminations. Assume that Z(s) is the relevant statistic for the null of equal contaminations $H_s:C^{te}(s)=C^{tr}(s)$ against the alternative $\overline{H}_s:C^{te}(s) \neq C^{tr}(s)$.

Zhang (2002) shows that testing for H versus $\overline{H}$ is equivalent to testing for $H_s$ versus $\overline{H}_s$ for $\forall s \in S$ and so, constructs a general statistic Z from Z(s). One such Z is $$Z = \int_{\lfloor s \rfloor}^{\lceil s \rceil} Z(s) \cdot w(s) \cdot d(s) \tag{1}$$

where w(s) is a weight function and $\lfloor s \rfloor$ and $\lceil s \rceil$ are the lower and upper bound of the score $s \in S$. D-SOS differs from the Zhang statistic Z in 3 notable ways: the scoring function $\phi$, the weights w(s) and the contamination statistic Z(s). Each are addressed in turn, below.

The Zhang test Z in Equation (1) uses the identity operator as $\phi$, leaving inputs unchanged in the univariate case. D-SOS instead scores instances from most to least likely according to a specified criterion. To give a concrete example, for anomaly detection via density estimation, this property of $\phi$ can be expressed as $$\phi(x_i) \leq \phi(x_j) \Rightarrow Pr(f_X^{tr}(x_i) \geq f_X^{tr}(x_j)) \geq 1-\in \tag{2}$$

for $x_i, x_j \in \chi$ and $\in$, a (sufficiently small) approximation error. With the property in Equation (2), instances in high-density regions of the training set $X^{tr}$ (inliers) score low; those in low-density regions (outliers) score high. Here, the scoring function $\phi$ can be thought of as a density-preserving projection (Vries et al (2008)): it performs both (1) crude density estimation and (2) dimensionality reduction. D-SOS is data-adaptive in the sense that it can estimate $\phi$ from data—this point will be returned to, below. The intrinsic structure in the scoring function $\phi$ is the catalyst for adjusting the weights w(s) and the statistic Z(s) in Equation (1).

D-SOS can update weights w(s) to be congruent with the scoring function $\phi$. When projecting to the outlier subspace, only large values signify unusual points whereas both small and large values are viewed as extremes in the Zhang test. Univariate tests of equal distributions such as the Anderson-Darling and the Cramer-von Mises tests are particular cases of the Zhang test with specific choices of Z(s) and w(s). These tests place more weight at the tails to reflect the severity of tail exceedances relative to deviations in the center of the distributions. The D-SOS weights can correct for extremes only residing in the upper (rightmost) tail of scores s. D-SOS weights w(s) can be specified as $$w(s)=1-C^{tr}(s) \cdot (2-C^{tr}(s)) \tag{3}$$

These weights w(s) shift most of the mass from the high-density to the low-density regions and make the test statistic Z in Equation (1) most sensitive to changes in the tail(s) of the distribution. Thus, D-SOS chases the tails.

Because the scoring function $\phi$ in Equation (2) is an approximation, a statistic is constructed based on the ranks of outlier scores and not on the exact levels of these scores. The weighted area under the receiver operating characteristic curve (WAUC) (Wieand et al (1989)) is a robust rank-order statistic invariant to changes in level so long as the underlying ranking is unaffected. The WAUC is related to the probability that inputs from the test set $X^{te}$ are more anomalous than inputs from the training set $X^{tr}$, $\Pr(\phi(X^{te}) \geq \phi(X^{tr}))$. The WAUC, denoted as T, is defined as $$T = \int_{[s]} D(s) \cdot w(s) \cdot d(s)$$

$$D(s) = C^{te}(s) \cdot f_s^{tr}(s) \quad (4)$$

In view of the parallels between the Zhang statistic Z in Equation (1) and the WAUC denoted as T in Equation (4), the WAUC reframes the problem in terms of the discrimination probability of outlier scores. Formally, the WAUC is a D-SOS test statistic for dataset shift. For anomaly detection, D-SOS pairs a density-preserving scoring function $\phi$ with weights $w(s)$ chosen to highlight low-density regions. Changes in high-density regions do not warrant the same scrutiny and are thus suitably discounted.

The D-SOS null hypothesis of dataset shift $H_{DS}$ is that most instances in the test set resemble—are inliers with respect to—the training set. The alternative $\overline{H}_{DS}$ is that the test set contains more outliers than expected if the two samples were exchangeable. In some embodiments, D-SOS specifies the null $H_{DS}$ against alternative $\overline{H}_{DS}$ as $$H_{DS}: T \leq T_P$$

$$\overline{H}_{DS}: T > T_P \quad (5)$$

where $T_P$ assumes exchangeability. The null $H_{DS}$ is rejected if a disproportionally large number of outliers are observed in the test set $X^{te}$. Changes with minimal impact on the tails are not rejected, where the outliers lie.

In sum, through the mapping to the outlier subspace, D-SOS can simplify a nonparametric two-sample test with multivariate data to a univariate representation. The power of the test relies on the outlier subspace preserving most of the information about the original samples i.e., the projection does not compromise the ability to discriminate inliers from outliers.

Some parametric univariate tests such as the robust Jarque-Bera test and the D'Agostino's $K^2$ test check for equality to the normal distribution based on higher moments, namely skewness and kurtosis. These tests, as does D-SOS, emphasize tail behavior. D-SOS may be a nonparametric multivariate improvement to these that loosens the equality constraint, opting instead for an inequality constraint.

Figure 3:
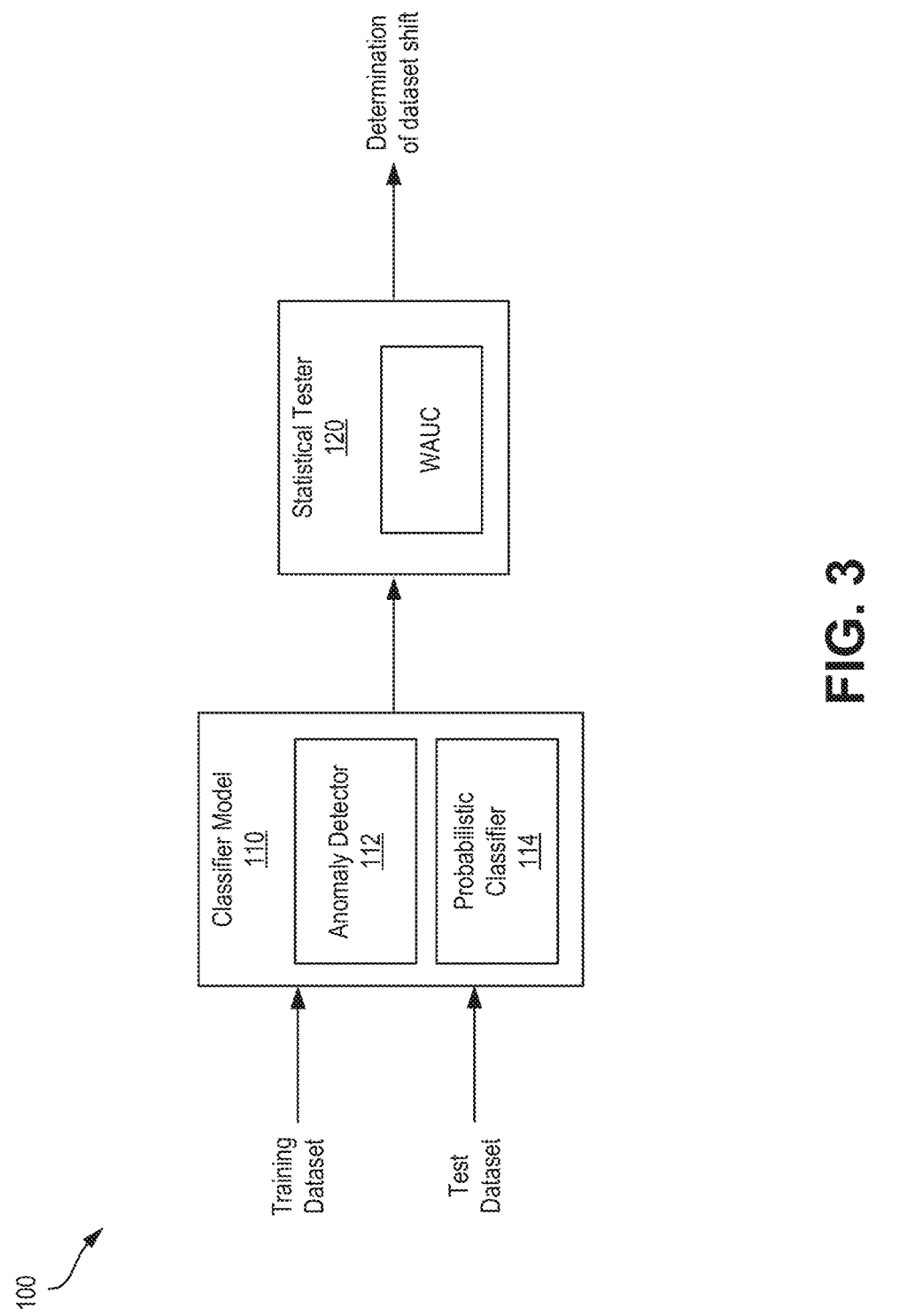
FIG. 3 is a simplified schematic diagram of a dataset shift detection system, according to an embodiment.

Implementation of D-SOS as a data drift detection system 100 in some embodiments, as illustrated in FIG. 3 and described herein, tests for dataset shift and distributional divergence by leveraging outlying scores based on anomaly detection from unsupervised methods, such as Isolation Forest (iForest) or by utilizing membership probabilities from probabilistic classification, such as Random Forest (RF).

D-SOS can be configured to capture different notions of outlyingness, such as anomaly detection and probabilistic classification. For example, in some embodiments, an outlier can be defined in terms of anomaly detection (in an example, using Isolation Forest), referred to herein as an outlier D-SOS variant or "D-SOS (Outlier)". In other embodiments, an outlier can be defined in terms of probabilistic classification (in an example, using Random Forest), referred to herein as a classifier D-SOS variant or "D-SOS (Classifier)". It should be understood that D-SOS is not constrained to a single notion of outlyingness, and can use other suitable aspects of outlyingness.

FIG. 3 illustrates D-SOS system 100, according to an embodiment. As shown in FIG. 3, system 100 can include a classifier model 110 and a statistical tester 120.

Classifier model 110 includes a scoring function $\phi$ such as anomaly detector 112 (for an outlier defined in terms of anomaly detection) or probabilistic classifier 114 (for an outlier defined in terms of probabilistic classification) that can be used to obtain outlier scores s for instances in an input training dataset and test dataset. Classifier model 110 also performs labeling and determines weights $w(s)$ associated with outlier scores.

In some embodiments, the scoring function $\phi$ implemented by anomaly detector 112 is an Isolation Forest (iForest).

In some embodiments, the scoring function $\phi$ implemented by probabilistic classifier 114 is a Random Forest (RF).

Statistical tester 120 determines a test statistic for dataset shift, such as WAUC, which can be used to determine if dataset shift has occurred.

For anomaly detection, in some embodiments, classifier model 110 of D-SOS uses anomaly detector 112 embodied as Isolation Forest (iForest), a tree-based ensemble for unsupervised outlier detection with low subsampling ratios, as the scoring function $\phi$ (Liu et al (2008)). Subsampling, as a way to induce diversity in ensembles and uncover masking and swamping effects, can be very effective (Zimek et al (2013)). iForest can allow D-SOS to scale, with a linear time complexity with a low constant and a low memory footprint from Isolation Forest. iForest is essentially tuning-free, effective, interpretable, robust and scalable, making it well suited for scoring function $\phi$.

Conveniently, iForest often outperforms other unsupervised algorithms used for outlier detection or comes close to the best-in-class performance (Emmott et al (2013), (2015)). Moreover, the performance of distance-based outlier detection methods deteriorates sharply with increasing dimension d because of the 'distance concentration effect' (Zimek, Schubert, and Kriegel (2012)). iForest conveniently works on subspaces (subset of attributes) and recursively splits the sample at random, avoiding distance-based computations. It can thus mitigate issues related to reliance on a distance metric in high dimensions.

In some implementations of D-SOS, recent iForest extensions and refinements are included (see Hariri et al (2018) and Liu et al (2010)). Letting $\mathcal{D} = X^{tr} \cup X^{te}$ denote the pooled training and test set, an iForest scoring function $\phi = \phi(\mathcal{D}, \mathcal{H}_{iF})$ can be estimated from data $\mathcal{D}$ and hyperparameters $\mathcal{H}_{iF}$. iForest is not immune to the 'curse of dimensionality' however: it's performance deteriorates with increasing dimension d (Liu et al (2012)). Other scoring functions may be more resilient in high dimension.

Training iForest has a time and space complexity of $\mathcal{O}(E\psi \log \psi)$ and $\mathcal{O}(E\psi)$ where E is the ensemble size and $\psi$ is the subsampling size. Empirically, default hyperparameters of $\psi = 256$ and $E \geq 100$ performs well across a wide range of domains and datasets, requiring no costly hyperparameter tuning. iForest scales with large sample size n because $\psi \ll n$ and dimension d—its algorithmic complexity does not depend on d. Modern datasets often contain a mix of categorical, ordinal and continuous features with missing data. iForest, like its supervised kin, Random Forest (Breiman (2001)) often handles these edge cases with little to no preprocessing. iForest scores have a consistent and interpretable meaning across datasets. They are bounded between 0 and 1 and scores higher than 0.5, as suggested in Liu, Ting and Zhou (2008) are indicative of potential outliers. The higher the score, the more anomalous the instance.

Using iForest sheds the dependence on the predictive model itself. iForest provides a univariate, high-fidelity and consistent score that represents the degree to which an instance can be characterized as an outlier. Outlyingness is a relevant measure for data drift because it identifies the instances that least resemble those encountered in the training set. In contrast with model predictions, outlying scores are an explicit measure of divergence from a reference group. Outliers reside in a region of the data space that is "isolated" from the rest of the training examples. Outliers are few and different, whereas normal points are many and similar. Because iForest is an unsupervised method, it requires no knowledge of the outcomes (labels) to project the high-dimensional dataset into a score that has a clear interpretation: higher scores means more likely to be an outlier.

In the same vein as iForest other methods such as lightweight on-line detector of anomalies (Loda) can be swapped in to produce outlier scores. Loda (Pevny (2016)) uses random projection whereas iForest uses decision trees and it is, like iForest, an ensemble method. Emmott et al (2013) compares several unsupervised algorithms for anomaly detection, including Loda and iForest, and shows that the latter tends to perform well in most cases. Apart from decoupling model specification from data drift, another benefit of this method may be with respect to sensitivity analysis based on outliers.

For probabilistic classification, in some embodiments, classifier model 110 of D-SOS uses probabilistic classifier 114 embodied as random forests (RF), another tree-based ensemble (Breiman (2001)).

Conveniently, RF is robust to noise, has low predictive variance in terms of the bias-variance tradeoff and often gives competitive out-of-the-box performance with little tuning (see Fernández-Delgado et al (2014) and Wainberg et al (2016)). In some embodiments, the RF hyperparameters $\mathcal{H}_{RF}$ are calibrated with a Brier score, as described in Probst et al (2019). This turns the problem of identifying high-density from low-density examples in anomaly detection into that of separating indistinct from conspicuous examples in probabilistic classification. Higher probabilities of belonging to the test set indicate that the instance is diverging from expectations. That is, the instance does not conform well to the training set, which is the reference distribution. As before, the RF scoring function $\phi=\phi(\mathcal{D}, \mathcal{H}_{RF})$ is estimated from data $\mathcal{D}$ and hyperparameters $\mathcal{H}_{RF}$.

Figure 8:
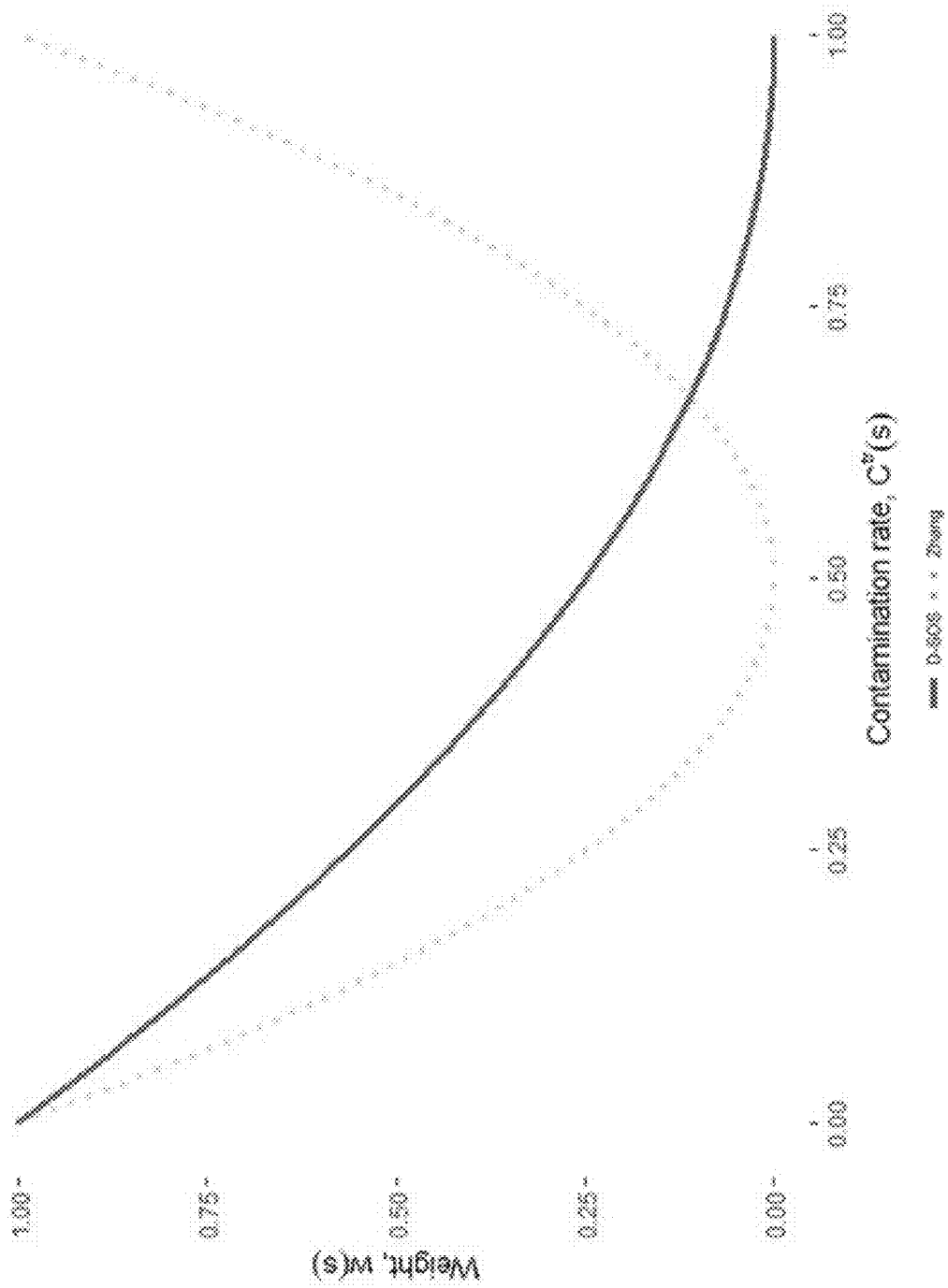
FIG. 8 is a graph of weights and contamination rates, according to an embodiment.

In some embodiments, implementation of weights w(s) follow from the scoring function $\phi$ and relate to contamination rates. Through $\phi$, contamination rates at various thresholds, $C^{tr}(s)$, can be estimated by classifier model 110. Weights w(s) can take the quadratic form with respect to the contamination rates $C^{tr}(s)$ described in Equation (3). FIG. 8 superimposes D-SOS weights over the Zhang weights, illustrating the relationship between contamination rate and weight. The Zhang weights are fit to scale for illustration; they convey the general shape, not the exact magnitude of the relationship between contamination rate and $C^{tr}(s)$ and weight w(s); D-SOS weights are true to scale.

For some embodiments of D-SOS, the contamination rate $C^{tr}(s)$ increases as the score s decreases. At the lowest score $\lfloor s \rfloor$, every observation is as an outlier; at the highest $\lceil s \rceil$, none is. The lower the threshold required to classify an instance as an outlier, the smaller the weight. Inliers have naturally low outlier scores. This functional form attaches high weights to outlying regions and conversely, low weights to inlying regions. Other functional forms can achieve a similar effect. As the contamination rate $C^{tr}(s)$ saturates at 1 at the lowest score $\lfloor s \rfloor$ (at 0 at the highest score $\lceil s \rceil$), D-SOS assigns a minimum weight of 0 (a maximum weight of 1).

As illustrated in FIG. 8, as the contamination rate saturates at 1 (0) at the lowest (highest) threshold, D-SOS assigns a minimum (maximum) weight of 0 (1).

It will be understood that both the scoring function $\phi$ and the weights w(s) disclosed herein are example implementation details. The D-SOS framework is flexible and many suitable choices other than those disclosed here may be viable.

For scoring function $\phi$, in some embodiments other suitable density-preserving techniques may be used. For example, density estimation based on deep neural networks such as MAF and NAF (Papamakarios, Pavlakou, and Murray (2017); Huang et al (2018)) can be utilized as the scoring function $\phi$. In some embodiments, densities can be approximated, and this imprecision begets speed.

Likewise, the functional form of the weights w(s) may vary so long as it discounts inlying regions and focuses on outlying regions. To complete the specification for a practical D-SOS test, scoring function $\phi$ and weights w(s) may be selected so that it is easy to implement, fast and widely applicable. Some special domains such as images and text may require additional preprocessing or feature extraction commensurate with the application.

With scoring function $\phi$ and weights w(s) as discussed above, systems and methods for detecting dataset shift, as disclosed herein, implement a permutation-based D-SOS test that can proceed as follows, in an example, implemented as a two-step approach to detecting dataset shift by classifier model 110 and statistical tester 120:

1. Train the scoring function $\phi=\phi(\mathcal{D}, \mathcal{H})$, such as iForest or RF, from data $\mathcal{D}=X^{tr} \cup X^{te}$ and hyperparameters $\mathcal{H}$.
2. Label the first $n^{tr}$ training instances in $\mathcal{D}$ as 0 and the last $n^{te}$ test instances as 1. Construct the label vector $y=[0_{n^{tr}}, 1_{n^{te}}]$.
3. Obtain the outlier scores on the training and test set, $s^{tr}=\phi(X^{tr})$ and $s^{te}=\phi(X^{te})$. Construct the score vector $s=[s^{tr}, s^{te}]$.
4. Calculate the weights vector w=w(s) to assign a weight to each threshold score in s based on the training contamination rates $C^{tr}(s)$.
5. Calculate the test statistic T, the WAUC, as a function of outlier scores s, labels y and weights w. That is, T=T(s,y,w).
6. Randomly permute the $n=n^{tr}+n^{te}$ instances in $\mathcal{D}$ from step 1. Call the shuffled data $\mathcal{D}^{(r)}$ for each permutation r=1, 2, . . . , R. Repeat steps 1-5 to subsequently compute $T^{(r)}=T(s^{(r)}, y^{(r)}, w^{(r)})$. $T^{(r)}$ is the null distribution of no dataset shift for the statistic.
7. For a specified type-1 error $\alpha$ calculate the threshold $T_\alpha$ in the right tail of the null distribution. $T_\alpha$ is the $1-\alpha$ percentile of $T^{(r)}$.
8. Reject the null of no dataset shift if $T \geq T_\alpha$.

The null distribution of the test statistic T makes no appeal to asymptotics and is accurate if the number of permutations or replicates R in step 6 is large enough (Marozzi (2004)).

For speed, in some embodiments, D-SOS is implemented as a sequential Monte Carlo test (Gandy (2009)) so that early stopping kicks in well before the permutation budget R is maxed out.

Figure 4:
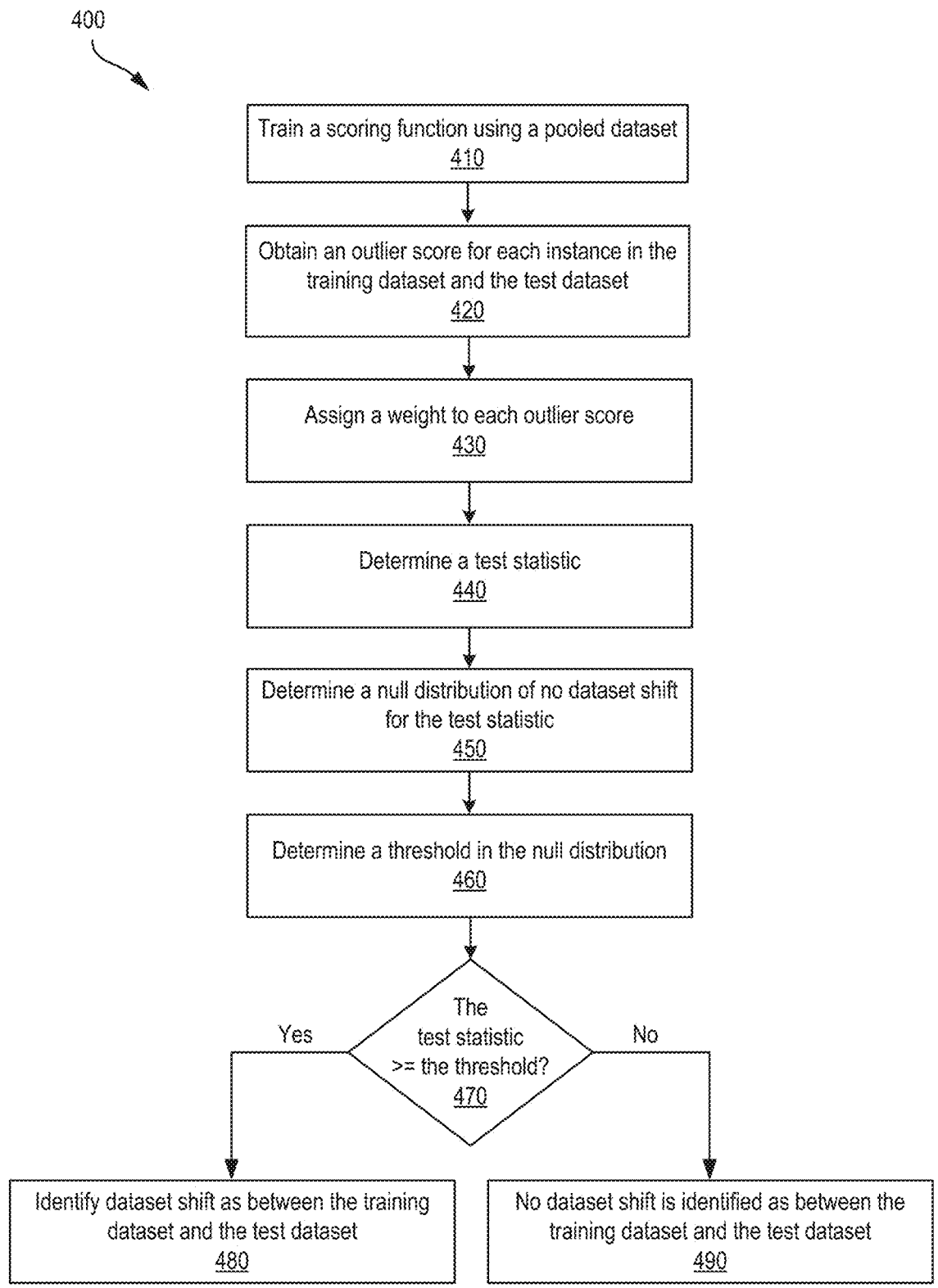
FIG. 4 is a flow chart of a method for detecting dataset shift, according to an embodiment.

FIG. 4 illustrates an embodiment of D-SOS as a method 400 for detecting dataset shift. Blocks 410 to 430 may be performed by classifier model 110. Blocks 440 to 490 may be performed by statistical tester 120. The steps are provided for illustrative purposes. Variations of the steps, omission or substitution of various steps, or additional steps may be considered.

At block 410, a scoring function, such as φ, is trained using a pooled dataset $\mathcal{D}$, the pooled dataset $\mathcal{D}$ a union of a training dataset $X^{tr}$ and a test dataset $X^{te}$.

In some embodiments, the scoring function φ is based on anomaly detection, such as by way of density estimation based on Equation (2).

In some embodiments, the anomaly detection scoring function φ is an Isolation Forest, and a function of the pooled dataset $\mathcal{D}$ and hyperparameters $\mathcal{H}$, such that φ=φ($\mathcal{D}$, $\mathcal{H}$).

In some embodiments, the scoring function φ is based on probabilistic classification.

In some embodiments, the probabilistic classification scoring function φ is a Random Forest, and a function of the pooled dataset $\mathcal{D}$ and hyperparameters $\mathcal{H}$, such that φ=φ($\mathcal{D}$, $\mathcal{H}$).

In some embodiments, the hyperparameters are calibrated with a Brier score.

In some embodiments, the scoring function φ includes a density estimation based on a deep neural network.

In some embodiments, training instances and test instances in the pooled dataset $\mathcal{D}$ are labeled with labels y.

At block 420, an outlier score s is obtained for each instance in the training dataset $X^{tr}$ and the test dataset $X^{te}$, based at least in part on the scoring function φ.

At block 430, a weight w(s) is assigned to each outlier score s based at least in part on training contamination rates $C^{tr}(s)$.

In some embodiments, the weight of outlier score, w(s), is based on Equation (3).

At block 440, a test statistic T is determined, based at least in part on the outlier scores s and the weights w.

In some embodiments, the test statistic is determined based at least in part on labels y of training instances and test instances in the pooled dataset $\mathcal{D}$.

In some embodiments, the test statistic is a weighted area under a receiver characteristic curve (WAUC).

In some embodiments, the test statistic is based on Equation (4).

At block 450, a null distribution $T^{(r)}$ of no dataset shift for the test statistic T is determined.

In some embodiments, the null distribution $T^{(r)}$ is determined based at least in part on the outlier scores s, the labels y, and the weights w.

In some embodiments, the null distribution $T^{(r)}$ is determined based at least in part on shuffled data $D^{(r)}$ from randomly permutated instances in the pooled dataset $\mathcal{D}$.

In some embodiments, the random permutations are sampled using a sequential Monte Carlo test.

At block 460, a threshold $T_\alpha$ in the null distribution $T^{(r)}$ is determined, in an example, in the right tail of the null distribution $T^{(r)}$.

In some embodiments, for a specified type-1 error α, the threshold $T_\alpha$ is a 1−α percentile in a right tail of the null distribution $T^{(r)}$.

At block 470, test statistic T is evaluated to determined whether it is greater than or equal to threshold $T_\alpha$. If the test statistic T is greater than or equal to the threshold $T_\alpha$, control flow proceeds to block 480 and dataset shift is identified as between the training dataset $X^{tr}$ and the test dataset $X^{te}$. In particular, the null of no dataset shift is rejected if the test statistic T is greater than or equal to the threshold $T_\alpha$.

If the test statistic T is not greater than or equal to the threshold $T_\alpha$, control flow proceeds to block 490 and no dataset shift is identified as between the training dataset $X^{tr}$ and the test dataset $X^{te}$. Namely, the null of no dataset shift is not rejected.

It should be understood that one or more of the blocks may be performed in a different sequence or in an interleaved or iterative manner.

Data drift detection system 100 may be implemented as software and/or hardware, for example, in a computing device 102. Method 400, in particular, one or more of blocks 410 to 490, may be performed by software and/or hardware of a computing device such as computing device 102.

Figure 5:
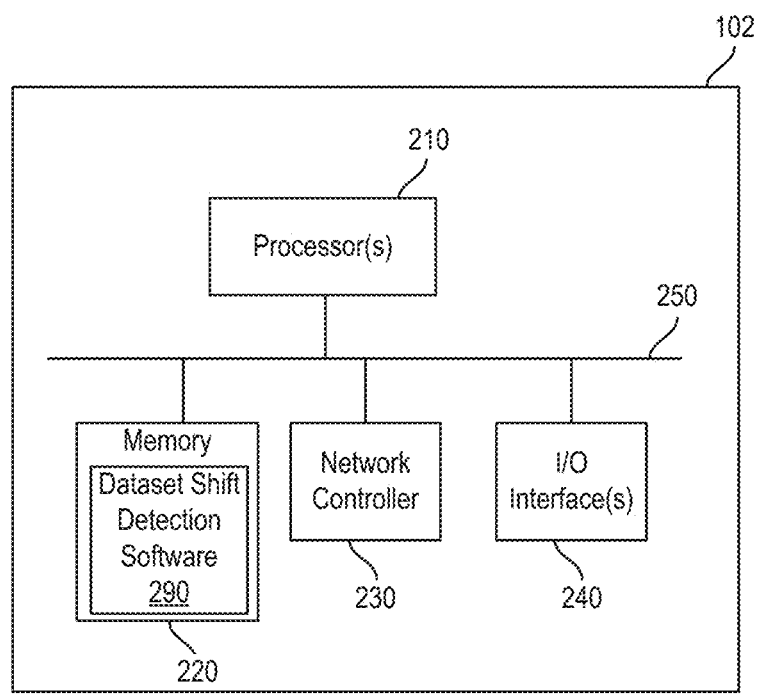
FIG. 5 is a block diagram of example hardware and software components of a computing device for dataset shift detection, according to an embodiment.

FIG. 5 is a high-level block diagram of computing device 102, according to an embodiment. Computing device 102, under software control, may detect dataset shift.

As illustrated, computing device 102 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 102. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of computing device 102 may include dataset shift detection software 290, training data storage (not shown), test data storage (not shown), and operating system (OS) software (not shown) allowing for basic communication and application operations related to computing device 102.

Dataset shift detection software 290 in memory 220 may perform dataset shift detection as disclosed herein.

Experimental work to-date illustrates how D-SOS differs from tests of equal distributions. Testing was performed comparing univariate testing (Kolmogorov-Smirnov (K-S)), multivariate testing (Energy), domain classifier, and examples of D-SOS.

Domain classifiers can be considered as a benchmark, since they can provide powerful two-sample tests that are state-of-the-art in performance and easy to implement.

A domain classifier approach pairs together a high-capacity classifier—a supervised model—with a subsequent test to tell whether the model can reliably distinguish training from test instances. If so, it is taken as evidence of dataset shift.

To implement a domain classifier benchmark for testing, Random Forest is selected as the classifier, and the Mann-Whitney U test selected as the subsequent statistical test.

Figure 6A:
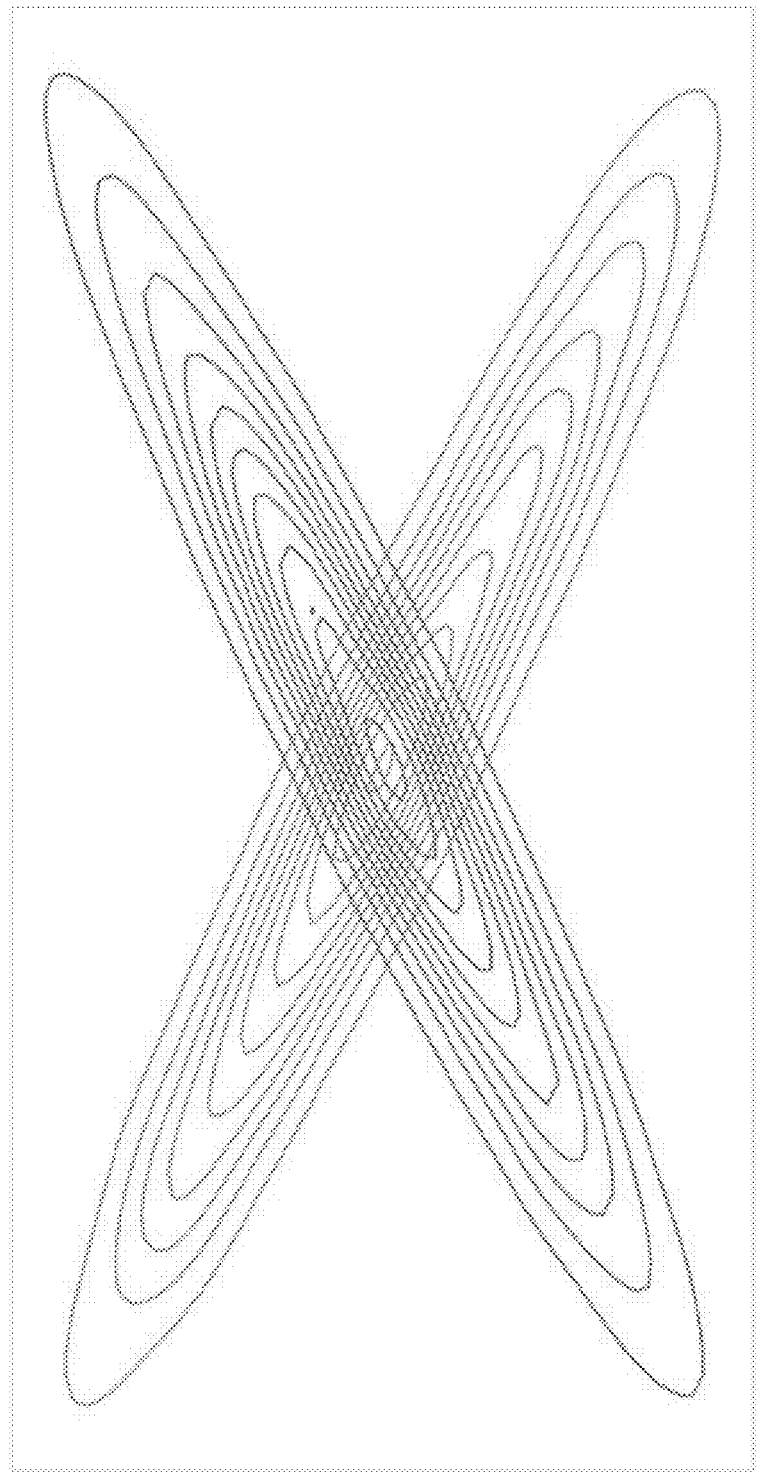
FIG. 6A illustrates first data for testing, according to an embodiment.

Testing was performed with first data (correlated features) including a first training dataset ("train") and a first test dataset ("test") as illustrated in FIG. 6A. The correlation in the first test dataset is + and in the first training dataset, −. The two distributions do diverge, and are not the same.

FIG. 6B is a chart of tests on the first data using the tests identified above, in particular, K-S, Energy, Domain Classifier, and an example of D-SOS. As can be seen, univariate tests ignore correlation and interaction across features. Thus, univariate methods may not be suitable in multivariate contexts.

Figure 6C:
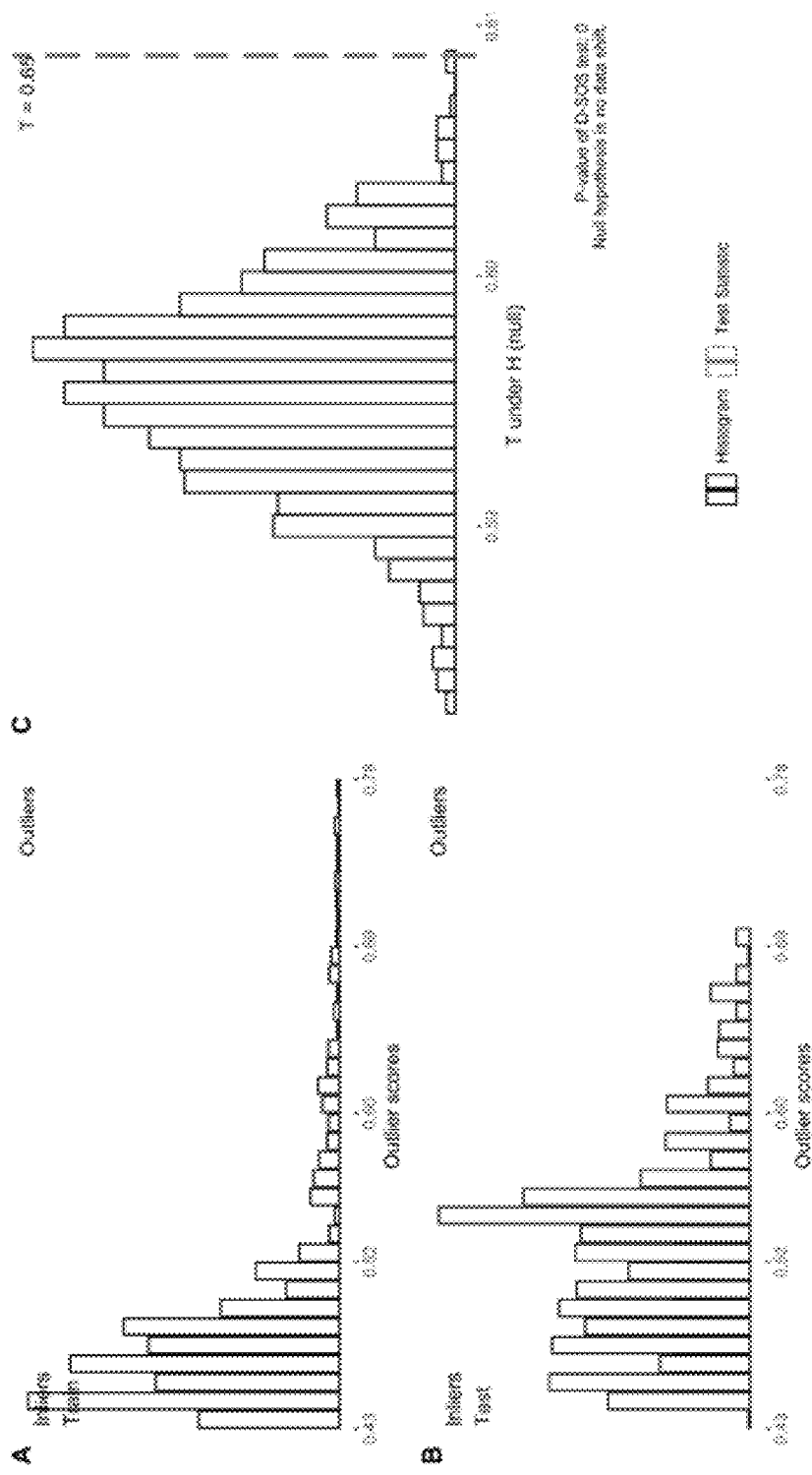
FIG. 6C illustrates the results of dataset shift with outlier scores ("D-SOS") testing on the first data of FIG. 6A, according to an embodiment.

FIG. 6C illustrates results of D-SOS testing on the first data.

Figure 7A:
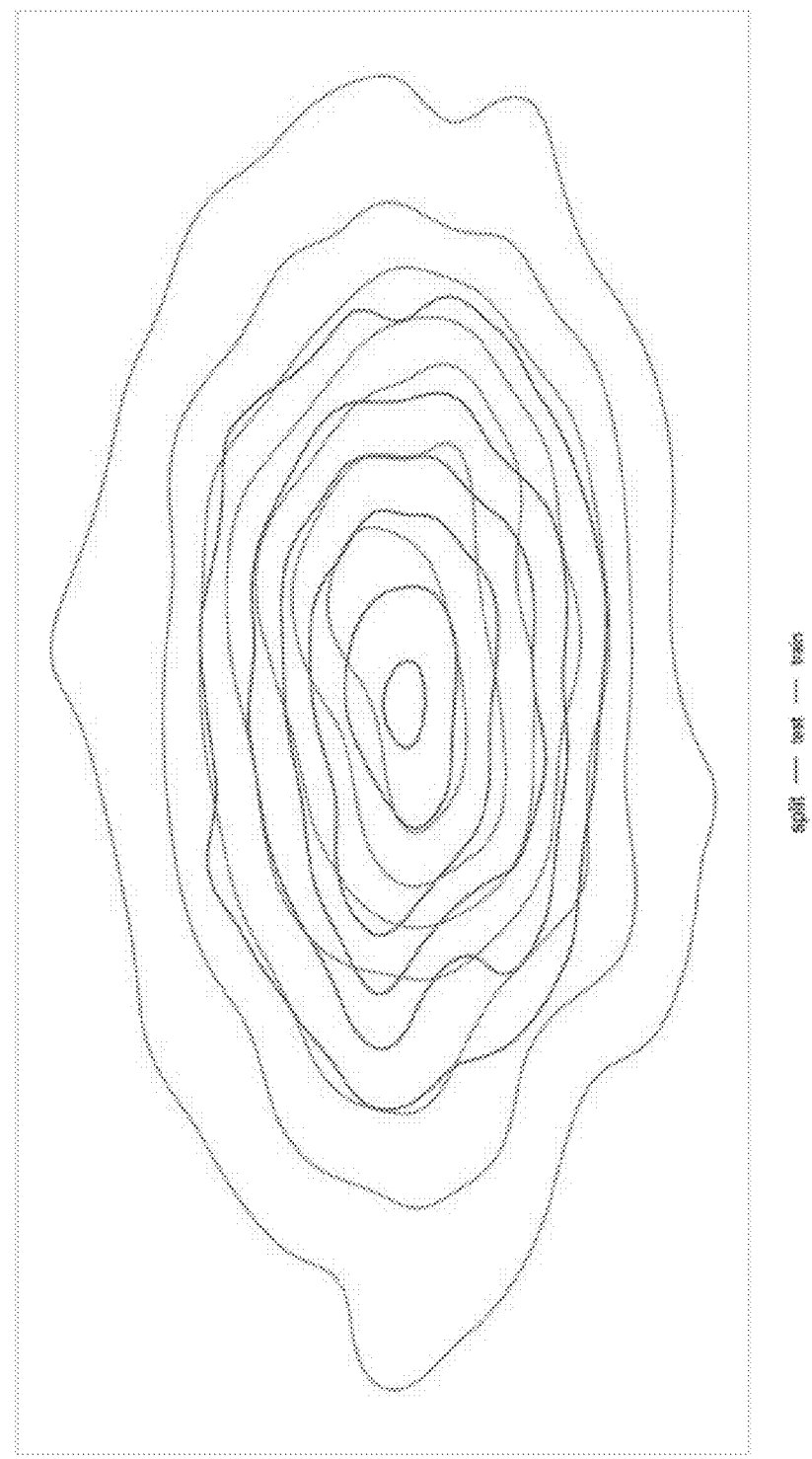
FIG. 7A illustrates second data for testing, according to an embodiment.

In another example, testing was performed with second data, as illustrated in FIG. 7A, a second test dataset ("test") consisting only of inliers from a second training dataset ("train").

The second test dataset and the second training dataset are simulated from a bivariate normal distribution with the same mean $\mu=0_2$ but with training covariance matrix $\Sigma^{tr}=I_2$ and test covariance matrix $\Sigma^{te}=0.5 \cdot I_2$, where $0_d$ is the 2-dimensional vector of zeros and $I_2$ is the 2×2 identity matrix. Training instances $X^{tr}$ are drawn from $X^{tr} \sim \mathcal{N}(\mu, \Sigma^{tr})$ and test instances $X^{te}$ are drawn from $X^{te} \sim \mathcal{N}(\mu, \Sigma^{te})$, with a training sample size $n^{tr}=2000$ and a test sample size $n^{te}=2000$.

As illustrated in FIG. 7A, the two distributions do not diverge in a way that would be considered alarming. The second test dataset is less abnormal than the second training dataset: instances from the former all come from high density region of the latter. Thus, the desired outcome in testing is to maintain the null of no dataset shift.

FIG. 7B is a table of testing results performed using the second test and training datasets described above, using the tests identified above. Results from D-SOS variants D-SOS (Outlier) and D-SOS (Classifier) are compared against competing methods: Kolmogorov-Smirnov (K-S) test, Energy test and domain classifier using random forest.

Kolmogorov-Smirnov (K-S) test and Energy test represent popular univariate and multivariate methods for detecting changes in distribution.

Domain classifier (DC), a discriminative learning approach to detecting dataset shift, serves as a benchmark against which D-SOS is compared.

The classifier in DC pools together training dataset and test dataset, assigns labels to each instance based on its origin—class 0 and 1 for training dataset and test dataset respectively—and trains the classifier on the pooled sample. The test in DC takes the predicted classifier scores and the binary labels to compute the p-value of the null. The null is that the probability of observing higher classifier scores in the training set than in test set is no better than random chance.

The DC benchmark is implemented with Random Forest (RF) as the classifier and the Mann-Whitney U test. Empirically RF is robust to noise, has low predictive variance in terms of the bias-variance tradeoff and often gives competitive or satisfactory out-of-the-box performance with little tuning (Fernández-Delgado et al (2014); Wainberg, Alipanahi, and Frey (2016); Probst, Boulesteix, and Bischl (2019)). Values for the RF hyperparameters can come from Probst, Boulesteix, and Bischl (2019) with the Brier score as the loss function to predict calibrated scores.

D-SOS and DC each take a two-step approach to detecting dataset shift. D-SOS pairs iForest or RF with the WAUC whereas DC pairs RF with the AUC—via the Mann-Whitney U test. The 'models' in the first step are unsupervised iForest and supervised RF; the test statistics in the second step are the WAUC and the AUC. Assuming that the runtime for completing second step is negligible, the computational bottleneck for both methods then lies in the first step.

The runtime of each method can be characterized by its algorithmic time complexity. Training random forest typically takes $\mathcal{O}(n \log n)$, compared to iForest's $\mathcal{O}(n \log n)$ where as before $n=n_0+n_1$ is the pooled sample size, $n_0$ is the training sample size, d is the number of dimensions (features) and $\in$ is the ensemble size i.e., the number of trees in the forest. In practice and principle, D-SOS based on iForest is much faster than DC based on RF.

The results illustrated in the table of FIG. 7B show that all the contenders fail in this case. They rightly detect the distributional change but this is a difference that should be ignored: this is a false alarm.

As can be seen in FIG. 7B, multivariate tests and domain classifier are unsuitable, as tests of equal distributions often reject the null of no difference even when the difference is small and/or inconsequential. The example D-SOS variant based on membership probabilities, D-SOS (Classifier), also rejects.

The example D-SOS testing based on outlier scores, D-SOS (Outlier), however, fails to reject, and passes because outlier scores are on average smaller in the test set. D-SOS testing detects that the data quality has likely improved and so maintains the null of no shift.

Figure 7C:
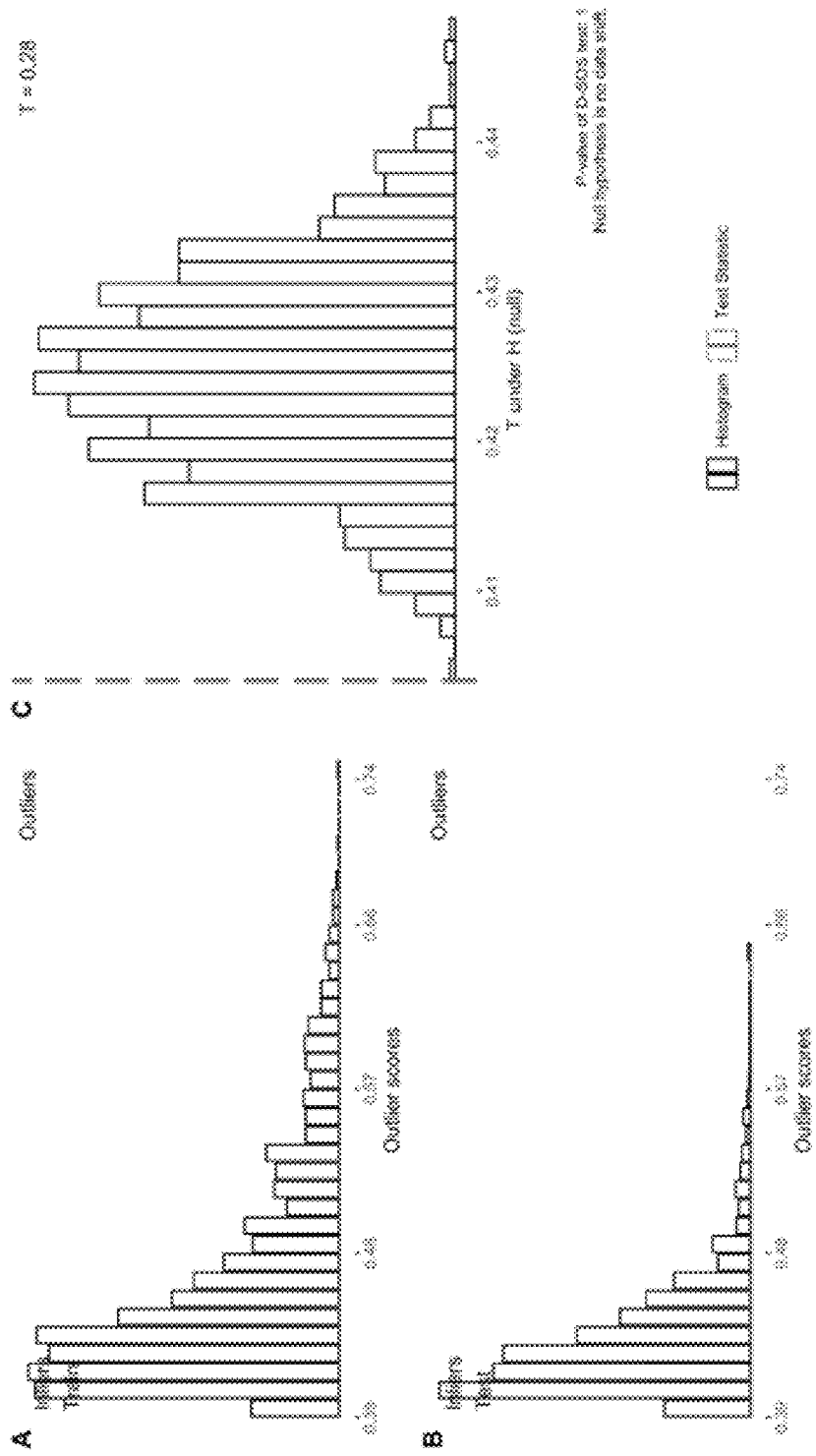
FIG. 7C illustrates D-SOS (Outlier) testing on the second data of FIG. 7A, according to an embodiment.

FIG. 7C illustrates results of D-SOS (Outlier) testing on the test and training data described above. FIG. 7C shows that on average outlier scores in the test set (B) are smaller than in the training set (A). D-SOS (Outlier) is more forgiving than competing methods as it does not indiscriminately penalize all distributional changes.

As illustrated in testing work, depending on the notion of outlyingness, D-SOS can be more forgiving precisely because it does not penalize all distributional changes. It lets users define which notion of outlyingness matters most.

A one-sided D-SOS, rather than two-sided, may, in contrast with tests of equal distributions, result in data quality improvements not rejecting the null. Had D-SOS been two-sided, it would also reject the null along with tests of equal distributions in the second data example discussed above. Thus, some differences may be improvements, rather than flaws. As result, D-SOS raises fewer false alarms.

Figure 9:
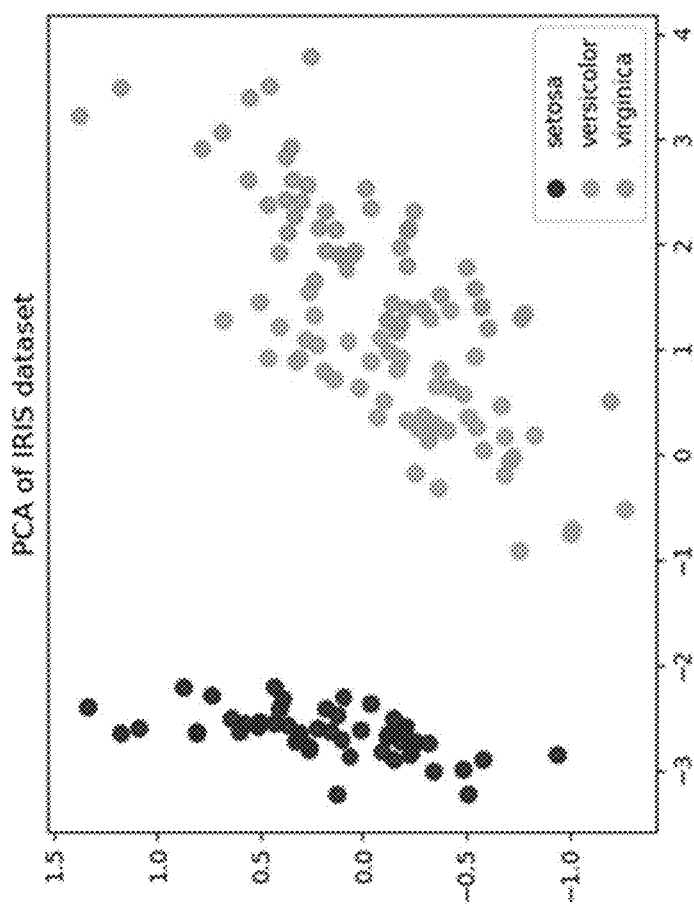
FIG. 9 is a graph of principal component analysis (PCA) of an Iris dataset, according to an embodiment.

In examples, D-SOS (Outlier) was applied on the canonical Iris dataset (Fisher (1936)). The Iris dataset comprises of species of Iris flowers, *setosa, versicolor*, and *virginica*, with d=4 correlated features, length and width of sepal and petal for each flower, and n=50 observations each. The first two principal components for all 3 species in FIG. 9 illustrate that the species (classes) are separable.

Figure 10:
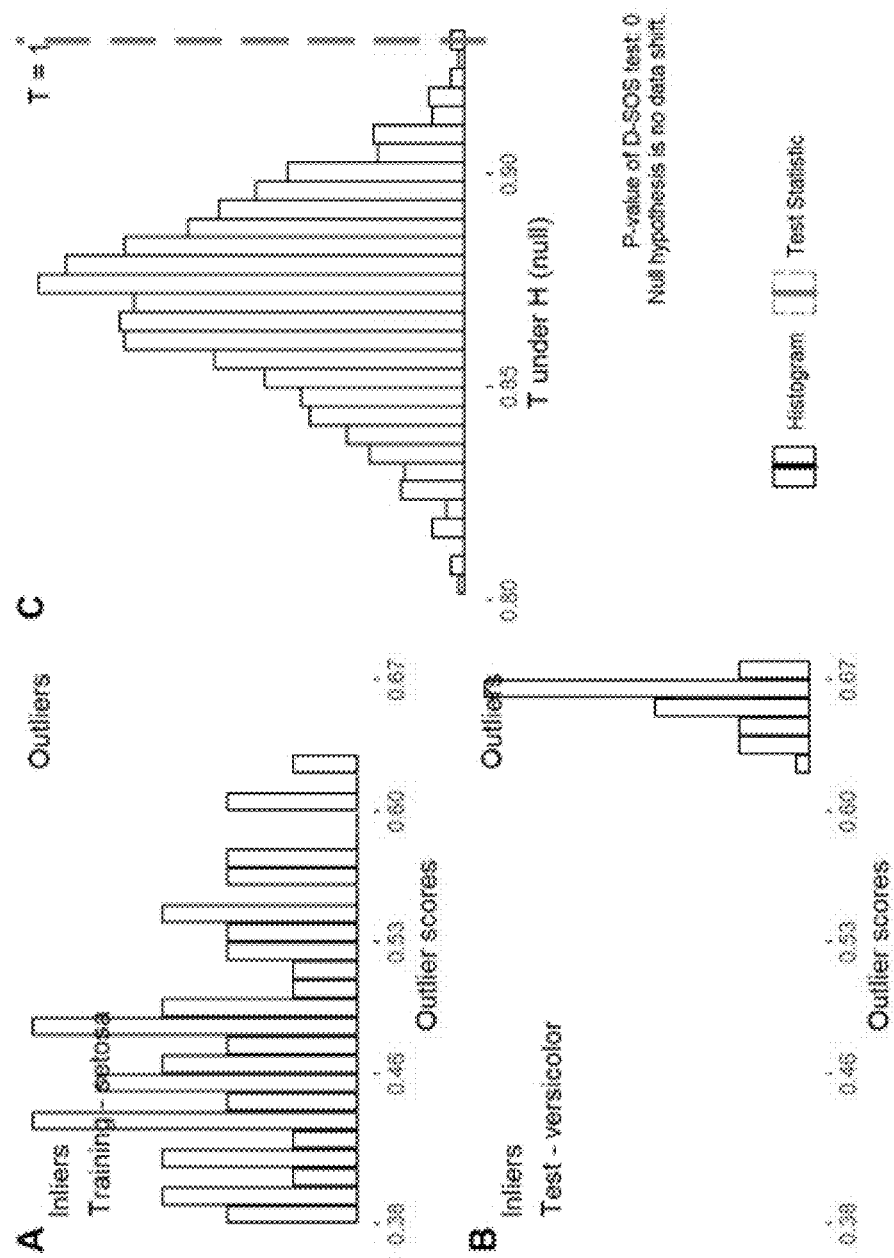
FIG. 10 illustrates D-SOS (Outlier) applied to an Iris dataset, according to an embodiment.

In a first Iris example, FIG. 10 illustrates D-SOS (Outlier) applied to a training set of *setosa* and a test set of *versicolor*. Panel A displays the distribution of outlier scores on *setosa*. Panel B displays the distribution of these scores on *versicolor* with the outlier detection method trained on *setosa*. Comparing the two shows that conditioning on *setosa*, *versicolor* has more outliers: the contamination rate is higher at any given threshold. Panel C plots the null distribution, via permutation, of the test statistic T—the WAUC—assuming that both species come from the same distribution. D-SOS (Outlier) rejects the null $H_0$ of no dataset shift with a WAUC of 1, the maximum attainable value, with a corresponding p-value of 0.

In a second Iris example, the training set $X^{tr}$ is *virginica*, the test set $X^{te}$ is *versicolor* and an outlier is defined in terms of probabilistic classification using a classifier D-SOS variant, D-SOS (Classifier).

Figure 11:
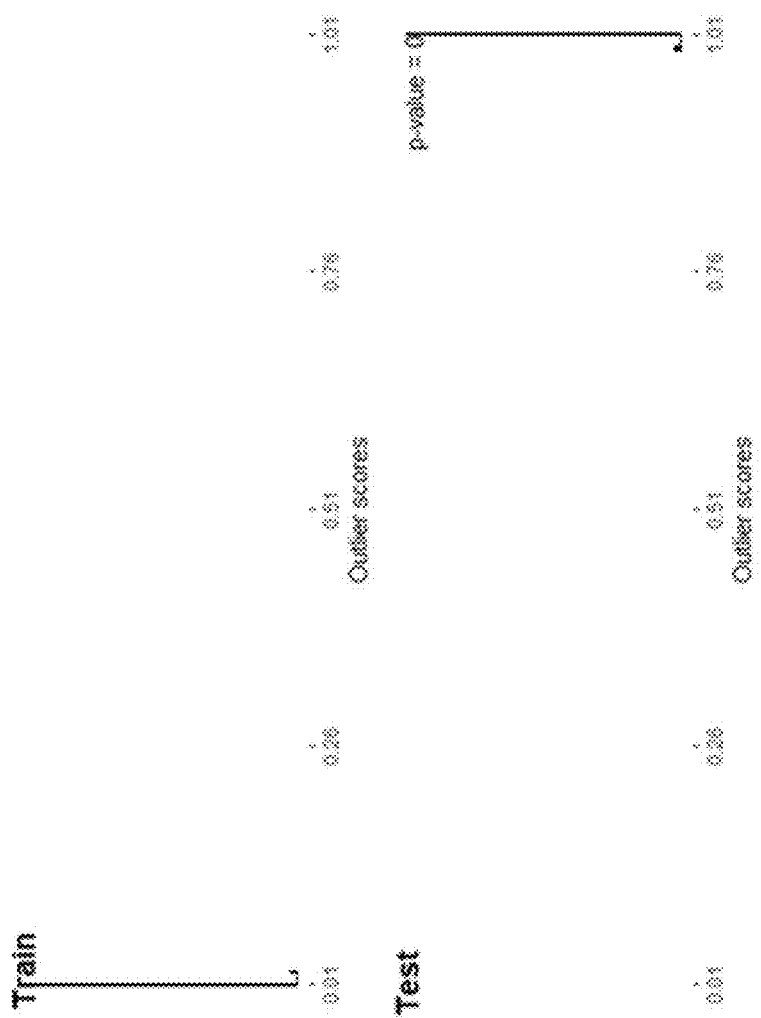
FIG. 11 illustrates distributions of outlier scores in an Iris dataset, performed by D-SOS (Classifier) based on probabilistic classification, according to an embodiment.

The higher the probability that an example belongs to the test set, the more anomalous it is. To score low, an instance should be indistinguishable from training examples. Here, the classifier estimates the scoring function $\phi$ from the pooled dataset $\mathcal{D}$ in each r permutation. D-SOS (Classifier) adheres the closest to two-sample classifier tests. The test rejects the null: the classifier separates training from test set. The distributions (histograms) of outlier scores in FIG. 11 peak at the extreme left and right for the training and test set respectively.

In a third Iris example, the training set $X^{tr}$ is *virginica*, the test set $X^{te}$ is *versicolor* and an outlier is defined in terms of anomaly detection using an outlier D-SOS variant, D-SOS (Outlier).

Figure 12:
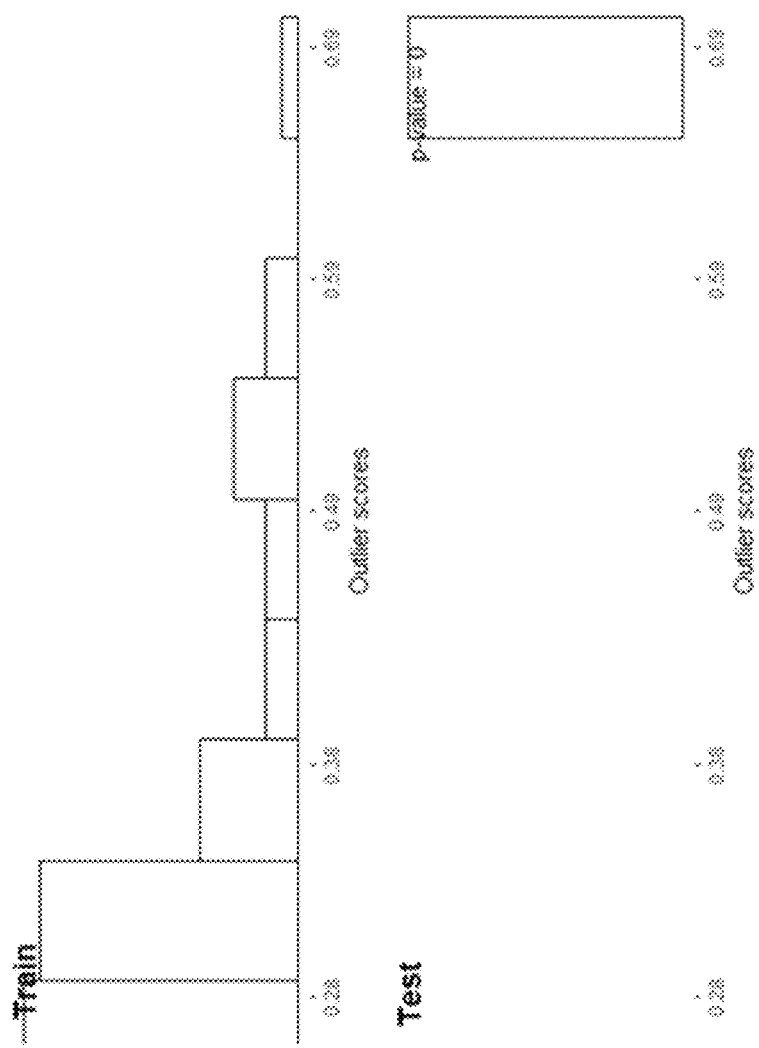
FIG. 12 illustrates distributions of outlier scores in an Iris dataset, performed by D-SOS (Outlier) based on anomaly detection, according to an embodiment.

The higher the outlier score, the more anomalous an example with respect to the training set. To score low, an instance should resemble many other training examples. Here, the outlier detection method calibrates the scoring function $\phi$ from the training portion $X^{tr}$ of the pooled dataset $\mathcal{D}$ in each r permutation. As shown in FIG. 12, the training distribution (histogram) of outlier scores is right-skewed and the test distribution again clusters at the extreme right. D-SOS (Outlier), based on outlier scores from anomaly detection, also rejects the null.

Thus, each Iris example, applying D-SOS variants based on different outlier scores, agree and reject the null emphatically (p-value<0.001).

Experimental work has also been performed using example D-SOS on simulated data perturbations, varying, for example, sample size n and dimension d. Simulated data includes corrupted instances, class imbalance, mean shift, (Gaussian) noise shift and prior probability shift, as described in further detail below.

Shifts can be simulated, affecting covariates and label proportions, from a two-component multivariate Gaussian mixture model (GMM). The GMM is a workhorse in density estimation and can mimic different types of data perturbations. Training sample $X_0$ is drawn from the reference distribution $F_0$:

$$X_0 \sim F_0 = \phi_0 \cdot \mathcal{N}(\mu_0^1, \Sigma_0^1) + (1-\phi_0) \cdot \mathcal{N}(\mu_0^2, \Sigma_0^2)$$

where $\phi_0(1-\phi_0) \in [0,1]$, $\mu_0^1(\mu_0^2)$ and $\Sigma_0^1(\Sigma_0^2)$ are the first (second) component weight, mean vector and covariance matrix respectively. Likewise, test samples $X_1$ are drawn from the target $F_1$:

$$X_1 \sim F_1 = \phi_1 \cdot \mathcal{N}(\mu_1^1, \Sigma_1^1) + (1-\phi_1) \cdot \mathcal{N}(\mu_1^2, \Sigma_1^2)$$

The no-difference baseline specifies the training sample size $n_0 \in \{10^2, 10^3, 10^4\}$, the test sample size $n_1 \equiv n_0$, the number of dimensions $d \in \{4, 8, 16, 32\}$, the class imbalance (component weight) $\phi_0 = \phi_1 = 0.5$, the components' mean vectors $\mu_0^1 = \mu_1^1 = 1_d$ and $\mu_0^2 = \mu_1^2 = -1_d$ and covariance matrices $\Sigma_0^1 = \Sigma_1^1 = \Sigma_0^2 = \Sigma_1^2 = I_d$. One or more parameters are varied, namely $\phi_0$, $\phi_1$, $\mu_1^1$ and $\Sigma_1^1$, to simulate the desired shifts, all else constant. From the GMM, the following types of shifts can be simulated at pre-set intensity levels:

1. Corrupted labels—starting with a single component, a fraction $\omega \in \{0.01, 0.02, 0.05\}$ of examples in the test set is drawn from the second component such that $\phi_0=1$ and $\phi_1=1-\omega$. The test set is corrupted with samples from the component absent in training.
2. Class imbalance—the balance is tilted so that the second component gradually takes up a greater share of the sample with $\phi_0 = \phi_1 \in \{0.4, 0.2, 0.1\}$. The test set preserves the same class imbalance observed in training.
3. Mean shift—the mean vector of the first component in the test distribution is changed $$\mu_1^1 = \left[\frac{k}{4}, 1_{d-1}\right],$$

where $k \in \{7, 6, 5, 3, 2, 1\}$. Of the d-dimensions, increase or decrease the mean of the first dimension in the first component.

4. Gaussian noise shift—the covariance matrix of the first component in the test distribution is changed $$\mathrm{diag}(\Sigma_1^1) = \left[\frac{\theta}{4}, 1_{d-1}\right],$$

where $\theta \in \{7, 6, 5, 3, 2, 1\}$ and $\mathrm{diag}(\cdot)$ assigns to the diagonal elements of the d-by-d covariance matrix. Of the d-dimensions, increase or decrease the variance of the first dimension in the first component.

5. Prior (probability) shift—the prior probability of the components is flipped so that the majority component becomes the minority in that $\phi_0 \in \{0.49, 0.45, 0.4\}$ is matched up with $\phi_1 = 1-\phi_0$. The test set does not preserve the class imbalance observed in training.

Given the type and intensity of shifts in (1)-(5), training and test samples were simulated and D-SOS tests applied for detecting dataset shift. For each type-intensity perturbed pair, the experiment was repeated 100 times. To evaluate the type I and type II errors of these tests, the number of times the null $H: F_1(x) = F_0(x)$ is rejected, i.e. the number of significant tests, was counted. If the desired outcome is to reject the null, the rejection rate is the true positive (detection) rate. If the desired outcome is not to reject, the rejection rate is the false positive (false alarm) rate.

Figure 13:
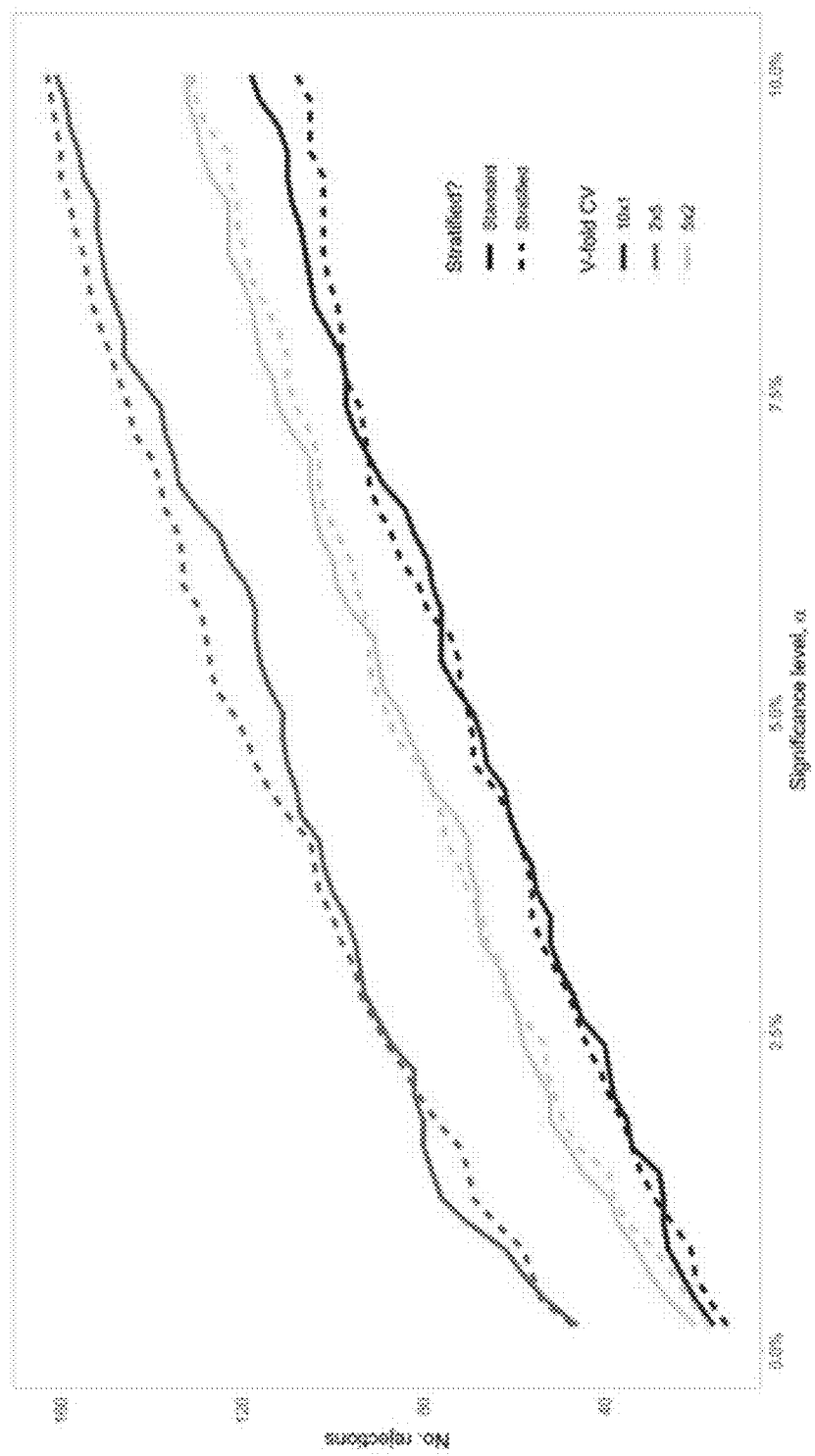
FIG. 13 illustrates results of cross-validation testing, according to an embodiment.

The impact of partition-induced dataset shift was examined on V-fold cross-validation (CV). As illustrated in FIG. 13 and discussed in more detail, 10-fold, 5-fold and 2-fold cross-validations (CV) were compared on 68 real-world classification tasks from the OpenML-CC18 benchmark. The results illustrate how the choice of the number of folds induces dataset shift. It is found that 10-fold (2-fold) CV is the least (most) prone to dataset shift and that 5-fold CV is often on par with 10-fold CV. Thus, ten may be a preferred number folds, but five may be suitable to save time. This informs the choice of a relevant cross-validation strategy when the goal is prediction or identification.

For the ensuing tests, the significance level $\alpha$ is fixed to $\alpha=0.05$. The simulations were run on a commodity desktop computer with an Intel® Core™ i7-8700 CPU @ 3.20 GHz processor, 64 GB RAM and R version 3.6.1 (2019 Jul. 5). The following D-SOS hyperparameters were set: the ensemble size E=100, the subsampling size $\psi=256$ and the number of permutations R=1000. With instances X and their corresponding labels or outcomes Y, dataset shift refers to changes in either the joint probability distribution Pr(Y,X) or the feature distribution Pr(X). Changes in Pr(X), Pr(Y|X) and Pr(Y) are referred to as covariate shift, concept drift and prior probability shift respectively (Jose G Moreno-Torres et al (2012)). While the proposed method applies to both changes in Pr(X) and Pr(Y,X), the covariate shift Pr(X) may be of primary interest, and restricted to the predictive features to avoid label cost. In practice, a non-trivial cost or an inevitable (time) delay may be associated with observing actual outcomes.

V-fold cross-validation (CV) can induce dataset shift because of random partitioning or fold assignment. Typically little to no effort is expended to keep the folds balanced. Some advanced methods address this weakness but in standard CV, feature distributions may differ drastically across folds.

It is questioned how often dataset shift occurs as the number of folds increases. To investigate how susceptible 3 common CV strategies are to partition-induced dataset shift: 10-fold, 5-fold and 2-fold CV were examined. The prevailing wisdom holds that 10-fold CV is hard to beat for predictive model selection (Kohavi and others (1995)) and least-square density estimation (Arlot and Lerasle (2016)).

Experiments were performed mimicking and simplifying that of Jose García Moreno-Torres, Sáez, and Herrera (2012), skipping the intervening step of fitting predictive models and instead, directly analyze the train-test splits from the CV folds.

Sixty-eight classification tasks from the OpenML-CC18 benchmark suite were examined (Casalicchio et al (2017)). The OpenML-CC18 benchmark suite is a curated and diverse repository of popular machine learning datasets, including CIFAR-10, MNIST-784 and others.

For each dataset, three variants of V-fold CV were used: 10×1, 5×2 and 2×5 CV. The first part in this notation is the number of folds and the second, the number of repeated trials. 5×2 is 5-fold CV repeated twice, 2×5 is 2-fold CV repeated 5 times and so on. Each CV strategy was repeated to yield the same number of train-test splits, namely 10. For each split, one part was the training set and constitutes of V-1 folds; the other, the hold-out fold, was the test set. All folds were either stratified or not (non-stratified). Stratified CV was based on the target (outcome) variable; it preserves class imbalance across folds and controls for prior probability shift. Although used for stratification, the target column was excluded in the tests. In total, 4080 D-SOS tests were run: 68 datasets, 3 CV strategies and 10 splits with all folds stratified or non-stratified.

The number of D-SOS null rejections were counted—a minimum of 0 and a maximum of 10—per dataset-CV strategy. The null was then tested against the alternative that CV with more folds leads to fewer rejections of dataset shift than CV with less folds. For example, rejection of 10×1 versus 2×5 would mean that on average 10-fold CV is less prone to data shift than 5-fold CV. The intuition is that as V increases, it becomes unlikely that the shrinking hold-out fold, the equivalent of the test set, contains many examples that are "out-of-distribution" with respect to the rest. Consistent with this intuition, this experiment set up the alternatives to be that 10×1 CV yields less rejections than both 5×2 and 2×5 and that likewise, 5×2 is superior to 2×5. The paired Wilcoxon signed-rank test (Hollander, Wolfe, and Chicken (2013)) was performed to detect differences between the number of rejections.

The effect of the number of folds V on dataset shift may not be robust if it is unduly sensitive to the selected significance level $\alpha$. A two-stage nested approach can be used to evaluate these differences. The first stage is to run D-SOS to count the rejections, and the second stage is to then compare the number of rejections across dataset-CV pairs. At each stage, some information is lost due to the fixed significance level $\alpha=0.05$. FIG. 13 plots the number of rejections, summed over all datasets, as a function of the significance thresholds at the first level. These curves suggest that differences, or lack thereof, between the CV variants are persistent for a wide range of appropriate significance level $\alpha$.

The results of the p-values of Wilcoxon signed-rank tests from analyzing dataset shift in V-fold CV show that using more folds is indeed less prone to dataset shift. Both 10-fold and 5-fold CV handily outperform 2-fold CV but the gap between 10-fold and 5-fold CV is narrower and at times, statistically significant: the null is not rejected in at least one case. This is consistent with Arlot and Lerasle (2016) who also finds that in least-square density estimation, "the performance increases much from V=2 to V=5 or 10, and then is almost constant". When comparing stratified to non-stratified CV, the two lines in the figure virtually lie on top of each other. Tellingly, the null is not rejected that stratified folds are better for the same number of folds. Stratification by class is likely to matter more when the predictive relationship Pr(Y|X) is more important than covariate shift Pr(X) alone.

These findings have polar implications for model selection for prediction versus identification (Arlot, Celisse, and others (2010)). They support the view that on one hand, 10-fold CV is a best practice for prediction, where it is assumed that no true model exists and it is not sought. On the other hand, 2-fold CV may serve best for identification, where it is desired to model consistency because it is posited that there is a true—and stable—generative process underneath it all. Case in point, operationally complementary pairs stability selection in Shah and Samworth (2013) is repeated 2-fold CV applied to variable selection i.e., identification. Implicitly high V aims to reduce data shift to obtain the most accurate predictions and low V, to induce it to recover features most robust to sampling variation.

Systems and methods for D-SOS, as disclosed herein, provide a framework for two-sample outlier tests. In an aspect, D-SOS chases the tails. It is contemplated that D-SOS can interrogate or confront the data with more pertinent hypotheses. Based on the scoring function, D-SOS can revert to acting like a test of equal distribution but it can also venture well beyond that. To combat false alarms, D-SOS can have a built-in conservative bias by putting less weights on regions where differences are unlikely to be evidence of decline. D-SOS may also offer the opportunity to bring to bear prior knowledge into the design of the scoring function in order to test specific hypotheses.

In some embodiments, D-SOS relies on brute-force permutations to estimate its null distribution. It is contemplated that considerable speedups could be achieved by deriving critical values for its asymptotic null distribution. Certain domains such as images, graphs or text may benefit from custom and context-aware scoring functions. Moreover, different weighting schemes can be considered, affecting sensitivity. The functional form of the postulated weights could be a hyperparameter worth tuning. Lastly, composite scoring functions, to combine several notions of outlyingness together, may enrich the types of hypotheses that can be tested.

Systems and methods for D-SOS, as disclosed herein, can be used, by way of example, to detect dataset shift for models in credit risk, marketing science (booking propensity) and anti-money laundering, such as in the context of a financial institution. Detecting dataset shift often implies that the predictive model is also out of date—there are emerging patterns in the new (test) data that had been absent in the historical (training) data. D-SOS can thus be used to decide whether model retraining, which would incorporate this new data, is timely and desirable.

Model training and retraining can be costly. Not only are some complex ML models computationally intensive and can take days and sometimes weeks to train, model retraining can affect a whole model lifecycle (pipeline) and can introduce new biases and bugs. On balance, it may be desirable to stick with existing challenges related to a model being out of date instead of facing unknown challenges arising from model retraining. It may thus be desirable to limit the number of necessary model updates.

A practical application of D-SOS can be to indicate when to initiate or schedule model retraining. All models eventually become obsolete (stale) but some expire faster than others. Conveniently, D-SOS may be a pragmatic and conservative test to detect if a models is past its expiry date. Tests of equal distribution, because of false alarms, encourage constant retraining even when it is not appropriate, and so increase the cost of model maintenance.

A distrust of tests of equal distributions due to their high false alarm rate can stem from having a large number of ML/AI models in production, because retraining them even when the changes in data distribution are benign would be both expensive and wasteful.

D-SOS is suitable for use on many ML models for model-data monitoring, in some examples, models used within a financial institution.

D-SOS can be particularly well suited in batch (non-streaming) and offline environments. Applications such as credit risk, marketing science (booking propensity) and anti-money laundering, may assume that the underlying processes that drive outcomes are fairly stable over time.

In an example of credit risk, factors that determine a borrower's credit score may be fairly robust, stationary and well-understood, which means that historical data (the training set) can be trusted to contain the patterns being mined for insights. Reliance on these factors is also why it is desirable for future data (the test set) to resemble the past data, inasmuch as possible. Extrapolating from past to future can thus be a sensible approach. D-SOS can be utilized to take new data in batches and accumulate a large enough sample size, collected over a sufficiently long period before a test comparing new to old is performed, and may impose a lag between data and model.

REFERENCES

Arlot, Sylvain, Alain Celisse, and others. 2010. "A Survey of Cross-Validation Procedures for Model Selection." Statistics Surveys 4: 40-79.

Arlot, Sylvain, and Matthieu Lerasle. 2016. "Choice of V for V-Fold Cross-Validation in Least-Squares Density Estimation." The Journal of Machine Learning Research 17 (1): 7256-7305.

Bickel, Steffen, Michael Brückner, and Tobias Scheffer. 2007. "Discriminative Learning for Differing Training and Test Distributions." In Proceedings of the 24th International Conference on Machine Learning, 81-88. ACM.

Breck, Eric, Neoklis Polyzotis, Sudip Roy, Steven Whang, and Martin Zinkevich. 2019. "Data Validation for Machine Learning." SysML.

Breiman, Leo. 2001. "Random Forests." Machine Learning 45 (1): 5-32.

Breunig, Markus M, Hans-Peter Kriegel, Raymond T Ng, and Jörg Sander. 2000. "LOF: Identifying Density-Based Local Outliers." In Proceedings of the 2000 Acm Sigmod International Conference on Management of Data, 93-104.

Brys, G., M. Hubert and A. Struyf. 2004. "A robustification of the Jarque-Bera test of normality," COMPSTAT 2004 Symposium, Section: Robustness.Casalicchio, Giuseppe, Jakob Bossek, Michel Lang, Dominik Kirchhoff, Pascal Kerschke, Benjamin Hofner, Heidi Seibold, Joaquin Vanschoren, and Bernd Bischl. 2017. "OpenML: An R Package to Connect to the Machine Learning Platform Openml." Computational Statistics 32 (3): 1-15. https://doi.org/10.1007/s00180-017-0742-2.

Chen, Xiangli, Mathew Monfort, Anqi Liu, and Brian D Ziebart. 2016. "Robust Covariate Shift Regression." In Artificial Intelligence and Statistics, 1270-9.

Ciémençon, S., M. Depecker and N. Vayatis. 2009. "AUC optimization and the two-sample problem," Proceedings of the 22nd International Conference on Neural Information Processing Systems.

Cieslak, David A, and Nitesh V Chawla. 2009. "A Framework for Monitoring Classifiers' Performance: When and Why Failure Occurs?" Knowledge and Information Systems 18 (1): 83-108.

Cook, R Dennis, and Sanford Weisberg. 1980. "Characterizations of an Empirical Influence Function for Detecting Influential Cases in Regression." Technometrics 22 (4): 495-508.

D'agostino, R. B., A. Belanger and R. B. D'Agostino Jr. 1990. "A suggestion for using powerful and informative tests of normality," The American Statistician, vol. 44, pp. 316-321.

Davison, C. and R. L. Smith. 1990. "Models for exceedances over high thresholds," Journal of the Royal Statistical Society: Series B (Methodological), vol. 52, pp. 393-425.

Davison, C. and C.-L. Tsai, 1992. "Regression model diagnostics," International Statistical Review/Revue Internationale de Statistique, pp. 337-353.

Demidenko, E. 2016. "The p-value you can't buy". In: The American Statistician 70.1, pp. 33-38.

DeVries, T. and G. W. Taylor. 2018. "Learning confidence for out-of-distribution detection in neural networks," arXiv preprint arXiv:1802.04865.

Emmott, Andrew F, Shubhomoy Das, Thomas Dietterich, Alan Fern, and Weng-Keen Wong. 2013. "Systematic Construction of Anomaly Detection Benchmarks from Real Data." In Proceedings of the Acm Sigkdd Workshop on Outlier Detection and Description, 16-21. ACM.

Emmott, Andrew, Shubhomoy Das, Thomas Dietterich, Alan Fern, and Weng-Keen Wong. 2015. "A Meta-Analysis of the Anomaly Detection Problem." arXiv Preprint arXiv: 1503.01158.

Fernández-Delgado, Manuel, Eva Cernadas, Senén Barro, and Dinani Amorim. 2014. "Do We Need Hundreds of Classifiers to Solve Real World Classification Problems?" The Journal of Machine Learning Research 15 (1): 3133-81.

Friedman, J. 2004. "On multivariate goodness-of-fit and two-sample testing." Gretton, Arthur, Karsten M Borgwardt, Malte J Rasch, Bernhard Schölkopf, and Alexander Smola. 2012. "A Kernel Two-Sample Test." Journal of Machine Learning Research 13 (March): 723-73.

Fisher, R. A. 1936. "The use of multiple measurements in taxonomic problems," Annals of eugenics, vol. 7, pp. 179-188.

Gandy, A. 2009. "Sequential implementation of Monte Carlo tests with uniformly bounded resampling risk," Journal of the American Statistical Association, vol. 104, pp. 1504-1511.

Gretton, Arthur, Kenji Fukumizu, Zaid Harchaoui, and Bharath K Sriperumbudur. 2009. "A Fast, Consistent Kernel Two-Sample Test." In Advances in Neural Information Processing Systems, 673-81, 2009.

Hariri, S., M. C. Kind and R. J. Brunner. 2018. "Extended isolation forest," arXiv preprint arXiv:1811.02141.

Hido, Shohei, Yuta Tsuboi, Hisashi Kashima, Masashi Sugiyama, and Takafumi Kanamori. 2011. "Statistical Outlier Detection Using Direct Density Ratio Estimation." Knowledge and Information Systems 26 (2): 309-36.

Hendrycks, D. and K. Gimpel. 2017. "A Baseline for Detecting Misclassified and Out-of-Distribution Examples in Neural Networks," 5th International Conference on Learning Representations, ICLR 2017, Toulon, France, Apr. 24-26, 2017, Conference Track Proceedings.

Hollander, Myles, Douglas A Wolfe, and Eric Chicken. 2013. Nonparametric Statistical Methods. Vol. 751. John Wiley & Sons.

Huang, Chin-Wei, David Krueger, Alexandre Lacoste, and Aaron Courville. 2018. "Neural Autoregressive Flows." arXiv Preprint arXiv:1804.00779.

Kanamori, Takafumi, Taiji Suzuki, and Masashi Sugiyama. 2011. "ff-Divergence Estimation and Two-Sample Homogeneity Test Under Semiparametric Density-Ratio Models." IEEE Transactions on Information Theory 58 (2): 708-20.

Kingma, D. P. and P. Dhariwal. 2018. "Glow: Generative flow with invertible 1×1 convolutions," Advances in Neural Information Processing Systems.

Koh, Pang Wei, and Percy Liang. 2017. "Understanding Black-Box Predictions via Influence Functions." In Proceedings of the 34th International Conference on Machine Learning-Volume 70, 1885-94. JMLR. org.

Kohavi, Ron, and others. 1995. "A Study of Cross-Validation and Bootstrap for Accuracy Estimation and Model Selection." In Ijcai, 14:1137-45. 2. Montreal, Canada.

Liu, F. T., K. M. Ting and Z.-H. Zhou. 2010. "On detecting clustered anomalies using SCiForest," in Joint European Conference on Machine Learning and Knowledge Discovery in Databases.

Liu, F. T., K. M. Ting and Z.-H. Zhou. 2012. "Isolation-based anomaly detection," ACM Transactions on Knowledge Discovery from Data (TKDD), vol. 6, pp. 1-39.

Liu, Fei Tony, Kai Ming Ting, and Zhi-Hua Zhou. 2008. "Isolation Forest." In 2008 Eighth Ieee International Conference on Data Mining, 413-22. IEEE.

Li, Jialiang, and Jason P Fine. 2010. "Weighted Area Under the Receiver Operating Characteristic Curve and Its Application to Gene Selection." Journal of the Royal Statistical Society: Series C (Applied Statistics) 59 (4): 673-92.

Lopez-Paz, D. and M. Oquab. 2017. "Revisiting Classifier Two-Sample Tests". In: 5th International Conference on Learning Representations, ICLR 2017, Toulon, France, Apr. 24-26, 2017, Conference Track Proceedings. OpenReview.net. URL: https://openreview.net/forum?id=SJkXfE5xx.

Marozzi, Marco. 2004. "Some Remarks About the Number of Permutations One Should Consider to Perform a Permutation Test." Statistica 64 (1): 193-201.

Moreno-Torres, Jose García, José A Sáez, and Francisco Herrera. 2012. "Study on the Impact of Partition-Induced Dataset Shift on kk-Fold Cross-Validation." IEEE Transactions on Neural Networks and Learning Systems 23 (8): 1304-12.

Moreno-Torres, Jose G, Troy Raeder, RocíO Alaiz-RodríGuez, Nitesh V Chawla, and Francisco Herrera. 2012. "A Unifying View on Dataset Shift in Classification." Pattern Recognition 45 (1): 521-30.

Papamakarios, George, Theo Pavlakou, and Iain Murray. 2017. "Masked Autoregressive Flow for Density Estimation." In Advances in Neural Information Processing Systems, 2338-47.

Pevny, Tomeáš. 2016. "Loda: Lightweight on-Line Detector of Anomalies." Machine Learning 102 (2). Springer: 275-304.

Pedregosa, F., G. Varoquaux, A. Gramfort, V. Michel, B. Thirion, O. Grisel, M. Blondel, P. Prettenhofer, R. Weiss, V. Dubourg, J. Vanderplas, A. Passos, D. Cournapeau, M. Brucher, M. Perrot and E. Duchesnay. 2011. "Scikit-learn: Machine Learning in Python," Journal of Machine Learning Research, vol. 12, pp. 2825-2830.

Probst, Philipp, Anne-Laure Boulesteix, and Bernd Bischl. 2019. "Tunability: Importance of Hyperparameters of Machine Learning Algorithms." Journal of Machine Learning Research 20 (53): 1-32.

Quionero-Candela, Joaquin, Masashi Sugiyama, Anton Schwaighofer, and Neil D Lawrence. 2009. Dataset Shift in Machine Learning. The MIT Press.

Rabanser, Stephan, Stephan Günnemann, and Zachary Lipton. 2019. "Failing Loudly: An Empirical Study of Methods for Detecting Dataset Shift." In Advances in Neural Information Processing Systems, 1394-1406.

Raeder, Troy, and Nitesh V Chawla. 2009. "Model Monitor (M2): Evaluating, Comparing, and Monitoring Models." Journal of Machine Learning Research 10 (July): 1387-90.

Ramdas, A., S. J. Reddi, B. Poczos, et al. 2015. "On the decreasing power of kernel and distance based nonparametric hypothesis tests in high dimensions". In: Twenty-Ninth AAAI Conference on Artificial Intelligence.

Rosenbaum, Paul R. 2005. "An Exact Distribution-Free Test Comparing Two Multivariate Distributions Based on Adjacency." Journal of the Royal Statistical Society: Series B (Statistical Methodology) 67 (4). Wiley Online Library: 515-30, 2005.

Schelter, Sebastian, Dustin Lange, Philipp Schmidt, Meltem Celikel, Felix Biessmann, and Andreas Grafberger. 2018. "Automating Large-Scale Data Quality Verification." Proceedings of the VLDB Endowment 11 (12): 1781-94.

Schubert, Erich, Arthur Zimek, and Hans-Peter Kriegel. 2014. "Generalized Outlier Detection with Flexible Kernel Density Estimates." In Proceedings of the 2014 Siam International Conference on Data Mining, 542-50. SIAM.

Sethi, Tegjyot Singh, and Mehmed Kantardzic. 2017. "On the Reliable Detection of Concept Drift from Streaming Unlabeled Data." Expert Systems with Applications 82: 77-99.

Shah, Rajen D, and Richard J Samworth. 2013. "Variable Selection with Error Control: Another Look at Stability Selection." Journal of the Royal Statistical Society: Series B (Statistical Methodology) 75 (1): 55-80.

Snoek, Jasper, Yaniv Ovadia, Emily Fertig, Balaji Lakshminarayanan, Sebastian Nowozin, D Sculley, Joshua Dillon, Jie Ren, and Zachary Nado. 2019. "Can You Trust Your Model's Uncertainty? Evaluating Predictive Uncertainty Under Dataset Shift." In Advances in Neural Information Processing Systems, 13969-80.

Stojanov, Petar, Mingming Gong, Jaime G Carbonell, and Kun Zhang. 2019. "Low-Dimensional Density Ratio Estimation for Covariate Shift Correction." Proceedings of Machine Learning Research 89: 3449.

Sugiyama, Masashi, Motoaki Kawanabe, and Pui Ling Chui. 2010. "Dimensionality Reduction for Density Ratio Estimation in High-Dimensional Spaces." Neural Networks 23 (1): 44-59.

Sugiyama, Masashi, Taiji Suzuki, and Takafumi Kanamori. 2012. Density Ratio Estimation in Machine Learning. Cambridge University Press.

Székely, Gábor J, Maria L Rizzo, et al. 2004. "Testing for Equal Distributions in High Dimension." InterStat 5 (16.10): 1249-72.

Vries, T., S. Chawla and M. E. Houle. 2012. "Density-preserving projections for large-scale local anomaly detection," Knowledge and information systems, vol. 32, pp. 25-52.

Wainberg, Michael, Babak Alipanahi, and Brendan J Frey. 2016. "Are Random Forests Truly the Best Classifiers?" The Journal of Machine Learning Research 17 (1): 3837-41.

Wang, Fulton, and Cynthia Rudin. 2017. "Extreme Dimension Reduction for Handling Covariate Shift." arXiv Preprint arXiv:1711.10938.

Wasserstein, Ronald L, Nicole A Lazar, and others. 2016. "The Asa's Statement on P-Values: Context, Process, and Purpose." The American Statistician 70 (2): 129-33.

Wieand, Sam, Mitchell H Gail, Barry R James, and Kang L James. 1989. "A Family of Nonparametric Statistics for Comparing Diagnostic Markers with Paired or Unpaired Data." Biometrika 76 (3): 585-92.

Zimek, Arthur, Matthew Gaudet, Ricardo J G B Campello, and Jörg Sander. 2013. "Subsampling for Efficient and Effective Unsupervised Outlier Detection Ensembles." In Proceedings of the 19th Acm Sigkdd International Conference on Knowledge Discovery and Data Mining, 428-36. ACM.

Zimek, Arthur, Erich Schubert, and Hans-Peter Kriegel. 2012. "A Survey on Unsupervised Outlier Detection in High-Dimensional Numerical Data." Statistical Analysis and Data Mining: The ASA Data Science Journal 5 (5): 363-87.

Zhang, Jin. 2002. "Powerful Goodness-of-Fit Tests Based on the Likelihood Ratio." Journal of the Royal Statistical Society: Series B (Statistical Methodology) 64 (2): 281-94.

Zhang, Jin. 2006. "Powerful Two-Sample Tests Based on the Likelihood Ratio." Technometrics 48 (1): 95-103.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for detecting dataset shift between a training dataset and a test dataset, the method comprising:
   training a scoring function using a pooled dataset, the pooled dataset including a union of the training dataset and the test dataset;
   obtaining an outlier score for each instance in the training dataset and the test dataset based at least in part on the scoring function;
   assigning a weight to each outlier score based at least in part on training contamination rates;
   determining a test statistic based at least in part on the outlier scores and the weights;
   determining a null distribution of no dataset shift for the test statistic;
   determining a threshold in the null distribution;
   determining whether the test statistic is greater than or equal to the threshold; and
   when the test statistic is greater than or equal to the threshold, identifying dataset shift between the training dataset and the test dataset.

2. The computer-implemented method of claim 1, wherein the test statistic is a weighted area under a receiver characteristic curve (WAUC).

3. The computer-implemented method of claim 2, wherein the test statistic is based on:

$$T=\int_{\lfloor s \rfloor}^{\lceil s \rceil} D(s) \cdot w(s) \cdot d(s)$$

where T is the WAUC, $\lfloor s \rfloor$ and $\lceil s \rceil$ are the lower and upper bound outlier scores, $D(s)$ is defined as $C^{te}(s) \cdot f_s^{tr}(s)$, $C^{te}(s)$ is a testing contamination rate, $f_s^{tr}(s)$ is a probability density function for the training dataset, $w(s)$ is a weight function, and integration is with respect to s.

4. The computer-implemented method of claim 1, further comprising: labelling training instances in the pooled dataset and labelling test instances in the pooled dataset to form labels; and wherein the test statistic is determined based at least in part on the labels.

5. The computer-implemented method of claim 4, wherein the null distribution is determined based at least in part on the outlier scores, the labels, and the weights.

6. The computer-implemented method of claim 5, wherein the null distribution is determined based at least in part on shuffled data from randomly permutated instances in the pooled dataset.

7. The computer-implemented method of claim 6, wherein the random permutations are sampled using a sequential Monte Carlo test.

8. The computer-implemented method of claim 1, wherein the scoring function is based on anomaly detection.

9. The computer-implemented method of claim 8, wherein the anomaly detection is by way of density estimation based on:

$$\phi(x_i) \leq \phi(x_j) \Rightarrow Pr(f_X^{tr}(x_i) \geq f_X^{tr}(x_j)) \geq 1-\in$$

where $\phi$ is the scoring function, $x_i, x_j \in \chi$, $\chi$ is a domain of the training dataset and the test dataset, $f_X^{tr}$ is a training dataset probability density function, and $\in$ is an approximation error.

10. The computer-implemented method of claim 8, wherein the scoring function includes an Isolation Forest.

11. The computer-implemented method of claim 10, wherein the Isolation Forest is a function of the pooled dataset and hyperparameters.

12. The computer-implemented method of claim 1, wherein the scoring function is based on probabilistic classification.

13. The computer-implemented method of claim 12, wherein the scoring function includes a Random Forest.

14. The computer-implemented method of claim 13, wherein the Random Forest is a function of the pooled dataset and hyperparameters.

15. The computer-implemented method of claim 14, wherein the hyperparameters are calibrated with a Brier score.

16. The computer-implemented method of claim 1, wherein the weight of outlier score, $w(s)$, is based on:

$$w(s)=1-C^{tr}(s) \cdot (2-C^{tr}(s))$$

where $C^{tr}(s)$ is the training contamination rate for the outlier score s.

17. The computer-implemented method of claim 1, wherein for a specified type-1 error $\alpha$, the threshold is a $1-\alpha$ percentile in a right tail of the null distribution.

18. The computer-implemented method of claim 1, wherein the scoring function includes a density estimation based on a deep neural network.

19. A computer system comprising:
   a processor;
   a memory in communication with the processor, the memory storing instructions that, when executed by the processor cause the processor to perform the method of claim 1.

20. A non-transitory computer readable medium comprising a computer readable memory storing computer executable instructions thereon that when executed by a computer cause the computer to perform the method of claim 1.

* * * * *